United States Patent
Yoshimura et al.

(10) Patent No.: US 11,917,615 B2
(45) Date of Patent: Feb. 27, 2024

(54) TERMINAL APPARATUS, BASE STATION APPARATUS, AND COMMUNICATION METHOD

(71) Applicant: Sharp Kabushiki Kaisha, Sakai (JP)

(72) Inventors: Tomoki Yoshimura, Sakai (JP); Shoichi Suzuki, Sakai (JP); Toshizo Nogami, Sakai (JP); Huifa Lin, Sakai (JP); Wataru Ouchi, Sakai (JP); Daiichiro Nakashima, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 105 days.

(21) Appl. No.: 17/625,807

(22) PCT Filed: Jul. 10, 2020

(86) PCT No.: PCT/JP2020/027130
§ 371 (c)(1),
(2) Date: Jan. 10, 2022

(87) PCT Pub. No.: WO2021/006355
PCT Pub. Date: Jan. 14, 2021

(65) Prior Publication Data
US 2022/0264611 A1      Aug. 18, 2022

(30) Foreign Application Priority Data
Jul. 11, 2019  (JP) ................ 2019-129118

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1614* (2013.01); *H04L 1/1812* (2013.01);
(Continued)

(58) Field of Classification Search
CPC ......... H04W 72/1273; H04W 72/0453; H04W 72/23; H04W 28/04; H04W 28/06;
(Continued)

(56) References Cited

U.S. PATENT DOCUMENTS

2019/0222349 A1*  7/2019  Gao ............... H04L 1/0026
2020/0220663 A1*  7/2020  Tsai ............... H04L 1/1864

OTHER PUBLICATIONS

Huawei, "Feature lead summary of HARQ enhancements for NR-U", 3GPP TSG RAN WG1 Meeting #97, R1-1907652, May 13-17, 2019, pp. 1-22.
(Continued)

*Primary Examiner* — Omar J Ghowrwal
(74) *Attorney, Agent, or Firm* — Keating & Bennett, LLP

(57) ABSTRACT

A terminal apparatus includes: a receiver configured to receive a PDCCH including a DCI format including a frequency resource assignment field, and determine that a PDSCH is not scheduled by the DCI format, based at least on a fact that the frequency resource assignment field is set to all ones; and a transmitter configured to transmit a HARQ-ACK codebook on a PUCCH, based at least on the fact that the frequency resource assignment field is set to all ones.

3 Claims, 16 Drawing Sheets

| ID for DCI formats | FDRA | TDRA | hopping flag | MCS | NDI | RV | HPN | TPC | Padding | UL/SUL indicator |
|---|---|---|---|---|---|---|---|---|---|---|
| 1 bit | X bits | 4 bits | 1 bit | 5 bit | 1 bit | 2 bits | 4 bits | 2 bits | Y bits | Z bits |

(51) Int. Cl.
  *H04L 5/00* (2006.01)
  *H04W 72/0453* (2023.01)
  *H04W 72/23* (2023.01)
  *H04L 1/1607* (2023.01)
  *H04L 1/1822* (2023.01)
  *H04W 28/04* (2009.01)
  *H04W 28/06* (2009.01)
  *H04W 72/04* (2023.01)

(52) U.S. Cl.
  CPC ............ *H04L 1/1822* (2013.01); *H04L 5/001* (2013.01); *H04L 5/0044* (2013.01); *H04L 5/0053* (2013.01); *H04L 5/0094* (2013.01); *H04W 28/04* (2013.01); *H04W 28/06* (2013.01); *H04W 72/04* (2013.01); *H04W 72/0453* (2013.01); *H04W 72/23* (2023.01)

(58) Field of Classification Search
  CPC .... H04W 72/04; H04L 1/1812; H04L 5/0053; H04L 1/1614; H04L 1/1822; H04L 5/0044; H04L 5/0094; H04L 5/001
  See application file for complete search history.

(56) References Cited

OTHER PUBLICATIONS

Ericsson, "HARQ and scheduling enhancements for NR-U", 3GPP TSG-RAN WG1 Meeting #97, R1-1907456, May 13-17, 2019, pp. 1-13.

Huawei et al., "Maintenance on HARQ-ACK enhancement", 3GPP TSG RAN WG1 Meeting #100bis-e, R1-2001536, Apr. 20-30, 2020, 8 pages.

NTT Docomo, "New SID Proposal: Study on New Radio Access Technology", RP-160671, 3GPP TSG RAN Meeting #71, Mar. 7-10, 2016, 8 pages.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

| HARQ process index | HARQ-ACK bit for serving cell#A | HARQ-ACK bit for serving cell#B |
|---|---|---|
| 0 | 0 | 0 |
| 1 | 1 | 0 |
| 2 | 1 | 0 |
| 3 | 1 | 1 |
| 4 | 0 | 0 |
| 5 | 1 | 0 |
| 6 | 0 | 0 |
| 7 | 0 | 0 |
| 8 | 0 | 1 |
| 9 | 0 | 1 |
| 10 | 1 | 0 |
| 11 | 1 | 1 |
| 12 | 1 | 0 |
| 13 | 1 | 1 |
| 14 | 0 | 1 |
| 15 | 0 | 0 |

FIG. 13

| HARQ process index | HARQ-ACK bit for serving cell#A |
|---|---|
| 0 | 0 |
| 1 | 1 |
| 2 | 1 |
| 3 | 1 |
| 4 | 0 |
| 5 | 1 |
| 6 | 0 |
| 7 | 0 |
| 8 | null |
| 9 | null |
| 10 | null |
| 11 | null |
| 12 | null |
| 13 | null |
| 14 | null |
| 15 | null |

FIG. 14

| HARQ process index | HARQ-ACK bit for serving cell#A | HARQ-ACK bit for serving cell#B | HARQ-ACK bit for serving cell#C |
|---|---|---|---|
| 0 | 0 | null | 0 |
| 1 | 1 | null | 0 |
| 2 | 1 | null | 0 |
| 3 | 1 | null | 1 |
| 4 | 0 | null | 0 |
| 5 | 1 | null | 0 |
| 6 | 0 | null | 0 |
| 7 | 0 | null | 0 |
| 8 | null | null | 1 |
| 9 | null | null | 1 |
| 10 | null | null | 0 |
| 11 | null | null | 1 |
| 12 | null | null | null |
| 13 | null | null | null |
| 14 | null | null | null |
| 15 | null | null | null |

FIG. 15

| ID for DCI formats | FDRA | TDRA | hopping flag | MCS | NDI | RV | HPN | TPC | Padding | UL/SUL indicator |
|---|---|---|---|---|---|---|---|---|---|---|
| 1 bit | X bits | 4 bits | 1 bit | 5 bit | 1 bit | 2 bits | 4 bits | 2 bits | Y bits | Z bits |

FIG. 16

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2019-129118 filed on Jul. 11, 2019, the contents of which are incorporated herein by reference.

BACKGROUND ART

In the 3$^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas covered by a base station apparatus are distributed in a cell structure. A single base station apparatus may manage multiple serving cells.

3GPP has been studying a next generation standard (New Radio (NR)) to make a proposal for International Mobile Telecommunication (IMT)-2020, a standard for a next generation mobile communication system developed by the International Telecommunication Union (ITU) (NPL 1). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

SUMMARY OF INVENTION

Technical Problem

An aspect of the present invention provides a terminal apparatus that efficiently performs communication, a communication method used for the terminal apparatus, a base station apparatus that efficiently performs communication, and a communication method used for the base station apparatus.

Solution to Problem (1) The first aspect of the present invention is a terminal apparatus including: a receiver configured to receive a PDCCH including a DCI format including a frequency resource assignment field, and determine that a PDSCH is not scheduled by the DCI format, based at least on a fact that the frequency resource assignment field is set to all ones; and a transmitter configured to transmit a HARQ-ACK codebook on a PUCCH, based at least on the fact that the frequency resource assignment field is set to all ones.

(2) The second aspect of the present invention is a communication method used for a terminal apparatus, the communication method including the steps of: a PDCCH including a DCI format including a frequency resource assignment field; determining that a PDSCH is not scheduled by the DCI format, based at least on a fact that the frequency resource assignment field is set to all ones; and transmitting a HARQ-ACK codebook on a PUCCH, based at least on the fact that the frequency resource assignment field is set to all ones.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between a subcarrier spacing configuration μ, the number $N^{slot}_{symb}$ of OFDM symbols per slot, and a cyclic Prefix (CP) configuration according to an aspect of the present embodiment.

FIG. 13 is a diagram illustrating an example related to resource mapping of a PDSCH according to an aspect of the present embodiment.

FIG. 14 is a diagram illustrating a configuration example of the single HARQ-ACK information according to an aspect of the present embodiment.

FIG. 15 is a diagram illustrating a configuration example of the single HARQ-ACK information according to an aspect of the present embodiment.

FIG. 16 is a diagram illustrating a configuration example of fields of DCI format 0_0 according to an aspect of the present embodiment.

DESCRIPTION OF EMBODIMENTS

Embodiments of the present invention will be described below.

"A and/or B" may be a term including "A", "B", or "A and B". floor(C) may be a floor function for a real number C. For example, floor(C) may be a function that outputs a maximum integer in a range of not exceeding the real number C. ceil(D) may be a roof function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I.

In a radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol is converted into a time-continuous signal in baseband signal generation. In the downlink, Cyclic Prefix-Orthogonal Frequency Division Multiplex (CP-OFDM) is at least used. In the uplink, one of CP-OFDM or Discrete Fourier Transform-spread-Orthogonal Frequency Division Multiplex (DFT-s-OFDM) is used. With Transform precoding being applied to CP-OFDM, DFT-s-OFDM may be given.

The OFDM symbol may be a term including a CP added to the OFDM symbol. In other words, a certain OFDM symbol may include the certain OFDM symbol, and a CP added to the certain OFDM symbol.

Figure 1:
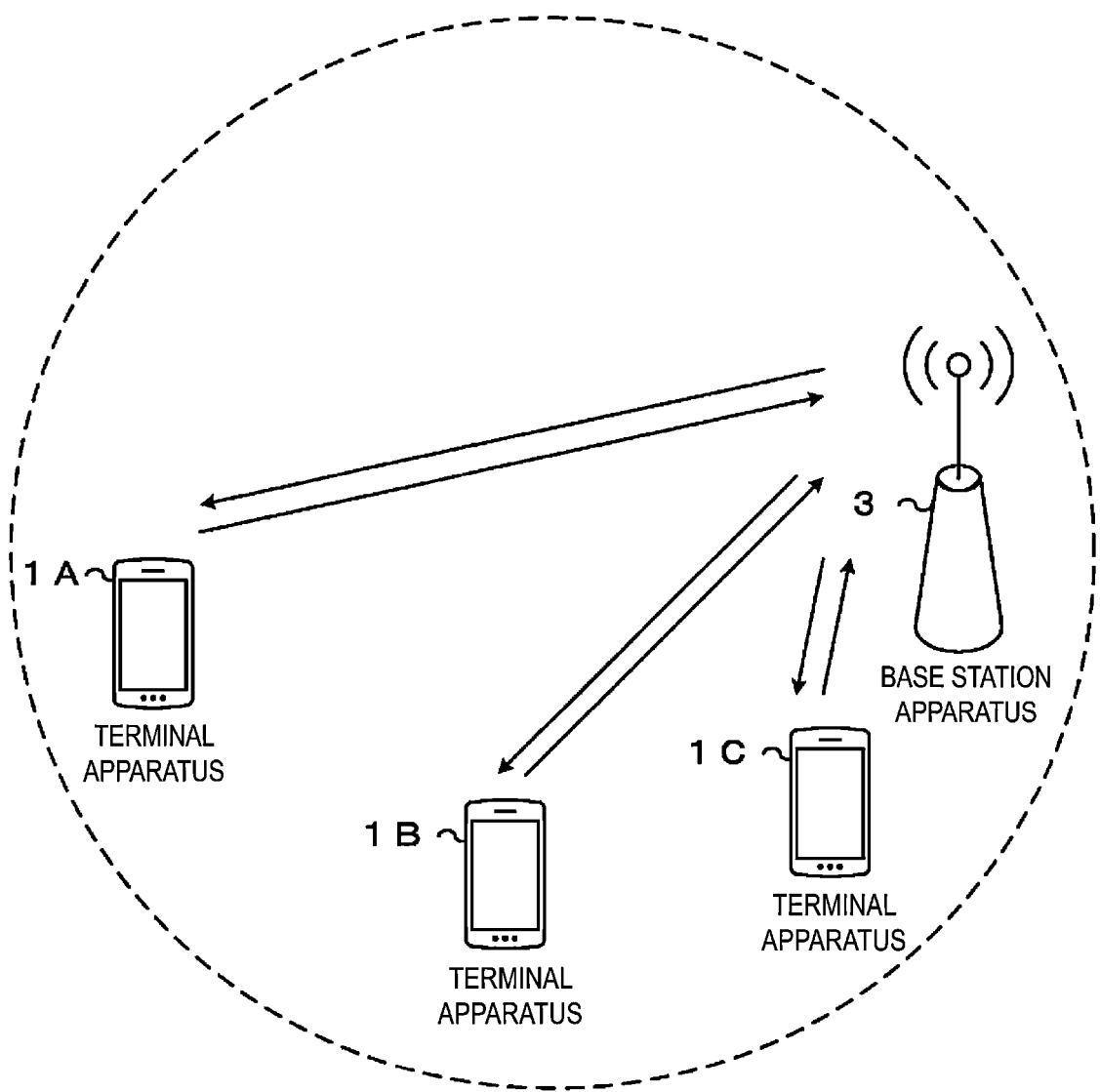
FIG. 1 is a conceptual diagram of a radio communication system according to an aspect of the present embodiment.

FIG. 1 is a conceptual diagram of the radio communication system according to an aspect of the present embodiment. In FIG. 1, the radio communication system at least includes terminal apparatuses 1A to 1C and a base station apparatus 3 (base station #3 (BS #3)). The terminal apparatuses 1A to 1C are hereinafter also referred to as "terminal apparatus 1" (User Equipment #1 (UE #1)).

The base station apparatus 3 may include one or multiple transmission apparatuses (or transmission points, transmission and/or reception apparatuses, transmission and/or reception points). In a case that the base station apparatus 3 includes multiple transmission apparatuses, each of the multiple transmission apparatuses may be deployed at different positions.

The base station apparatus 3 may provide one or multiple serving cells. The serving cell may be defined as a set of resources used for radio communication. The serving cell is also referred to as a cell.

The serving cell may at least include one downlink component carrier (downlink carrier), and/or one uplink component carrier (uplink carrier). The serving cell may at least include two or more downlink component carriers, and/or two or more uplink component carriers. The downlink component carrier and the uplink component carrier are also referred to as "component carrier (carrier)".

For example, for one component carrier, one resource grid may be given. For one component carrier and a certain subcarrier spacing configuration μ, one resource grid may be given. Here, the subcarrier spacing configuration μ is also referred to as numerology. The resource grid includes $N^{size,\mu}_{grid,x} N^{RB}_{sc}$ subcarriers. The resource grid starts from a common resource block $N^{start,\mu}_{grid}$. The common resource block $N^{start,\mu}_{grid}$ is also referred to as a reference point of the resource grid. The resource grid includes $N^{subframe,\mu}_{symb}$ OFDM symbols. x is a subscript indicating a transmission direction, and indicates one of a downlink or an uplink. For a set of a certain antenna port p, a certain subcarrier spacing configuration μ, and a certain transmission direction x, one resource grid is given.

$N^{size,\mu}_{grid,x}$ and $N^{start,\mu}_{grid}$ are given based at least on a higher layer parameter (CarrierBandwidth). The higher layer parameter is also referred to as an SCS specific carrier. One resource grid corresponds to one SCS specific carrier. One component carrier may include one or multiple SCS specific carriers. The SCS specific carrier may be included in system information. For each of the SCS specific carriers, one subcarrier spacing configuration μ may be given.

The SubCarrier Spacing (SCS) Δf may be Δf=2^μ·15 kHz. For example, the subcarrier spacing configuration μ may indicate one of 0, 1, 2, 3, or 4.

FIG. 2 is an example illustrating a relationship between the subcarrier spacing configuration μ, the number $N^{slot}_{symb}$ of OFDM symbols per slot, and a cyclic prefix (CP) configuration according to an aspect of the present embodiment. In FIG. 2A, for example, in a case that the subcarrier spacing configuration μ is 2, and the CP configuration is a normal cyclic prefix (normal CP), $N^{slot}_{symb}=14$, $N^{frame,\mu}_{slot}=40$, and $N^{subframe,\mu}_{slot}=4$. In FIG. 2B, for example, in a case that the subcarrier spacing configuration μ is 2, and the CP configuration is an extended cyclic prefix (extended CP), $N^{slot}_{symb}=12$, $N^{frame,\mu}_{slot}=40$, and $N^{subframe,\mu}_{slot}=4$.

In the radio communication system according to an aspect of the present embodiment, time unit $T_c$ may be used for expression of the length of the time domain. The time unit $T_c$ is $T_c=1/(\Delta f_{max} \cdot N_f)$. $\Delta f_{max}=480$ kHz. $N_f=4096$. A constant κ is $\kappa=\Delta f_{max} \cdot N_f/(\Delta f_{ref} N_{f,ref})=64$. $\Delta f_{ref}$ is 15 kHz. $N_{f,ref}$ is 2048.

Transmission of a signal in the downlink and/or transmission of a signal in the uplink may be organized into a radio frame (system frame, frame) having the length $T_f$. $T_f=(\Delta f_{max} N_f/100) \cdot T_s=10$ ms. "·" represents multiplication. The radio frame includes 10 subframes. The length $T_{sf}$ of the subframe is $(\Delta f_{max} N_f/1000) \cdot T_s=1$ ms. The number of OFDM symbols per subframe is $N^{subframe,\mu}=N^{slot}_{symb} N^{subframe,\mu}_{slot}$.

For a certain subcarrier spacing configuration μ, the number and indexes of slots included in the subframe may be given. For example, slot indexes $n^\mu_s$ may be given in ascending order with integer values in the range from 0 to $N^{subframe,\mu}_{slot}-1$ in the subframe. For the subcarrier spacing configuration μ, the number and indexes of slots included in the radio frame may be given. Slot indexes $n^\mu_{s,f}$ may be given in ascending order with integer values in the range from 0 to $N^{frame,\mu}_{slot}-1$ in the radio frame. $N^{slot}_{symb}$ continuous OFDM symbols may be included in one slot. $N^{slot}_{symb}=14$.

Figure 3:
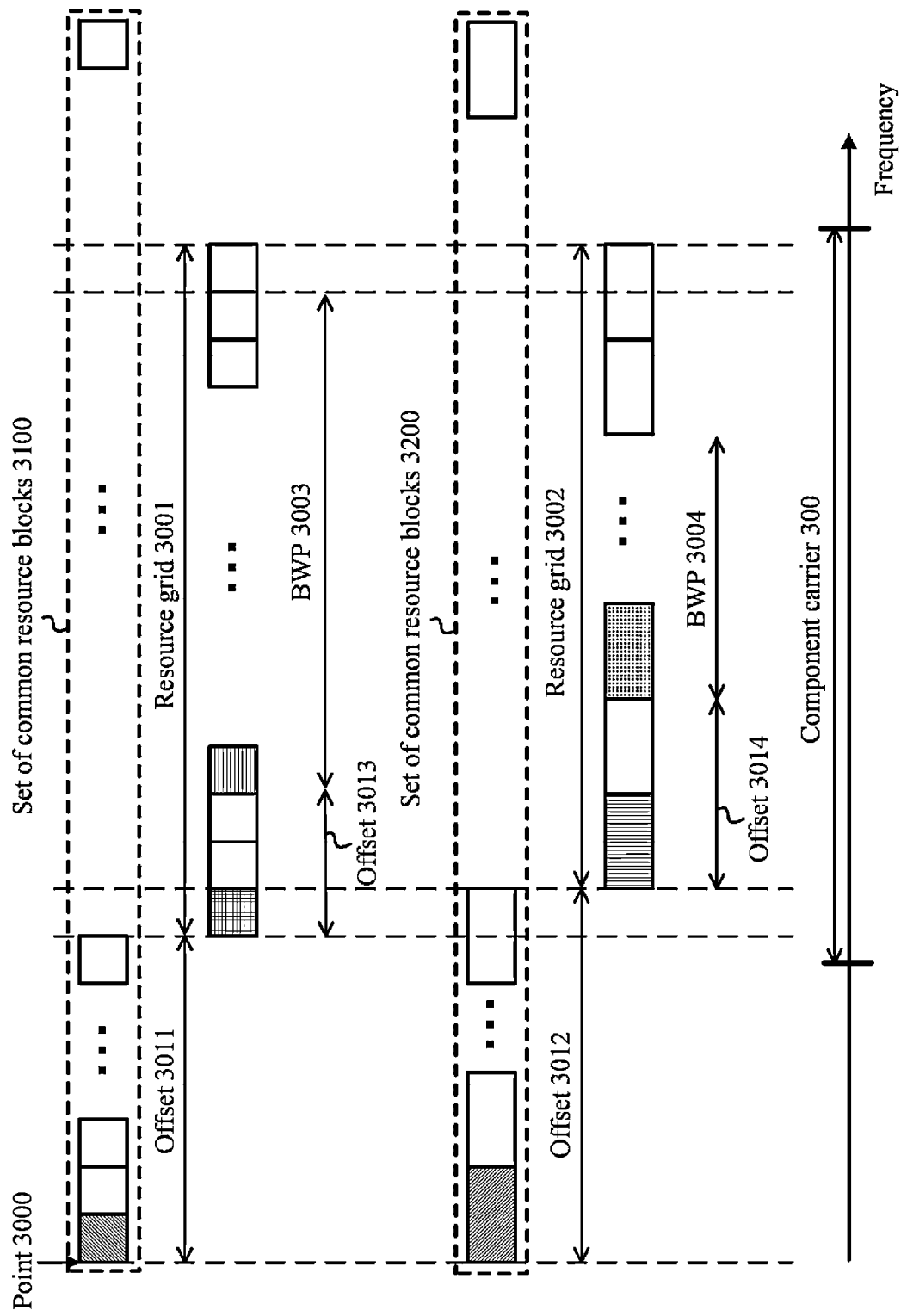
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing $\mu_1$ in a component carrier 300, and a configuration example of a resource grid of subcarrier spacing $\mu_2$ in the certain component carrier. As described above, for a certain component carrier, one or multiple subcarrier spacings may be configured. In FIG. 3, it is assumed that $\mu_1=\mu_2-1$. However, various aspects of the present embodiment are not limited to the condition of $\mu_1=\mu_2-1$.

The component carrier 300 is a band having a prescribed width in the frequency domain.

A Point 3000 is an identifier for identifying a certain subcarrier. The point 3000 is also referred to as a point A. A set 3100 of Common resource blocks (CRBs) is a set of common resource blocks for the subcarrier spacing configuration $\mu_1$.

Of the common resource block set 3100, a common resource block (block hatched with lines rising diagonally up and to the right in FIG. 3) including the point 3000 is also referred to as a reference point of the common resource block set 3100. The reference point of the common resource block set 3100 may be a common resource block having an index of 0 in the common resource block set 3100.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size,\mu}_{grid1,x}$ common resource blocks starting from the reference point of the resource grid 3001.

An offset 3013 is an offset from the reference point of the resource grid 3001 to a reference point ($N^{start,\mu}_{BWP,i1}$) of a Bandwidth Part (BWP) 3003 having an index of i1.

A common resource block set 3200 is a set of common resource blocks for the subcarrier spacing configuration $\mu_2$.

Of the common resource block set 3200, a common resource block (block hatched with lines rising diagonally up and to the left in FIG. 3) including the point 3000 is also referred to as a reference point of the common resource block set 3200. The reference point of the common resource block set 3200 may be a common resource block having an index of 0 in the common resource block set 3200.

An offset 3012 is an offset from the reference point of the common resource block set 3200 to a reference point of a resource grid 3002. The offset 3012 is represented by the number of common resource blocks for the subcarrier spacing $\mu_2$. The resource grid 3002 includes $N^{size,\mu}_{grid2,x}$ common resource blocks starting from the reference point of the resource grid 3002.

An offset 3014 is an offset from the reference point of the resource grid 3002 to a reference point ($N^{start,\mu}_{BWP,i2}$) of a BWP 3004 having an index of i2.

Figure 4:
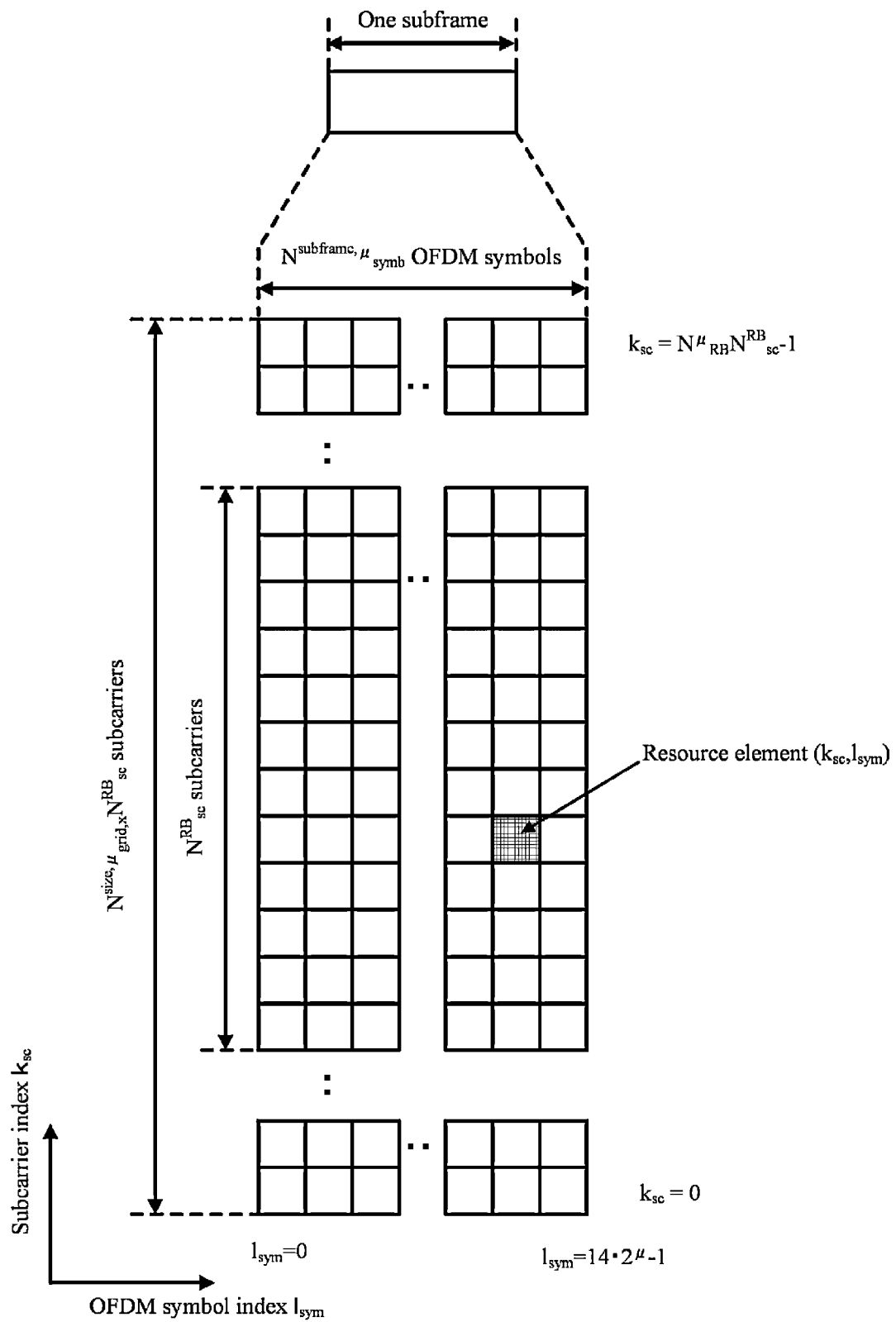
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $l_{sym}$, and the vertical axis corresponds to a subcarrier index $k_{sc}$. The resource grid 3001 includes $N^{size,\mu}_{grid1,x}N^{RB}_{sc}$ subcarriers, and $N^{subframe,\mu}_{symb}$ OFDM symbols. In the resource grid, a resource identified with the subcarrier index $k_{sc}$ and the OFDM symbol index $l_{sym}$ is also referred to as a Resource Element (RE).

The Resource Block (RB) includes $N^{RB}_{sc}$ continuous subcarriers. The resource block is a general term for a common resource block, a Physical Resource Block (PRB), and a Virtual Resource Block (VRB). Here, $N^{RB}_{sc}=12$.

A resource block unit is a set of resources corresponding to one OFDM symbol in one resource block. In other words, one resource block unit includes 12 resource elements corresponding to one OFDM symbol in one resource block.

The common resource blocks for a certain subcarrier spacing configuration $\mu$ are assigned with indexes (indexing) in ascending order from 0 in the frequency domain in a certain common resource block set. The common resource block having an index of 0 for a certain subcarrier spacing configuration $\mu$ includes (or collides with, matches) the point 3000. An index $n^{\mu}_{CRB}$ of the common resource block for a certain subcarrier spacing configuration $\mu$ satisfies a relationship of $n^{\mu}_{CRB}=\text{ceil}(k_{sc}/N^{RB}_{sc})$. Here, a subcarrier with $k_{sc}=0$ is a subcarrier having the same center frequency as the center frequency of a subcarrier corresponding to the point 3000.

The physical resource blocks for a certain subcarrier spacing configuration $\mu$ are assigned with indexes in ascending order from 0 in the frequency domain in a certain BWP. An index $n^{\mu}_{PRB}$ of the physical resource block for a certain subcarrier spacing configuration $\mu$ satisfies a relationship of $n^{\mu}_{CRB}=n^{\mu}_{PRB}+N^{start,\mu}_{BWP,i}$. Here, $N^{start,\mu}_{BWP,i}$ indicates a reference point of the BWP having an index of i.

The BWP is defined as a subset of common resource blocks included in the resource grid. The BWP includes $N^{size,\mu}_{BWP,i}$ common resource blocks starting from the reference point $N^{start,\mu}_{BWP,i}$ of the BWP. The BWP configured for the downlink carrier is also referred to as a downlink BWP. The BWP configured for the uplink component carrier is also referred to as an uplink BWP.

An antenna port may be defined by that a channel on which a symbol in a certain antenna port is conveyed can be inferred from a channel on which another symbol in the certain antenna port is conveyed (An antenna port is defined such that the channel over which a symbol on the antenna port is conveyed can be inferred from the channel over which another symbol on the same antenna port is conveyed). For example, the channel may correspond to a physical channel. The symbol may correspond to an OFDM symbol. The symbol may correspond to a resource block unit. The symbol may correspond to a resource element.

The fact that large scale property of a channel on which a symbol is conveyed in one antenna port can be inferred from a channel on which a symbol is conveyed in another antenna port is described that the two antenna ports are quasi co-located (QCL). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel on which a symbol is transmitted in one antenna port can be inferred from a channel on which a symbol is transmitted in another antenna port, the terminal apparatus 1 may assume that the two antenna ports are QCL. The fact that two antenna ports are QCL may mean that it is assumed that the two antenna ports are QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
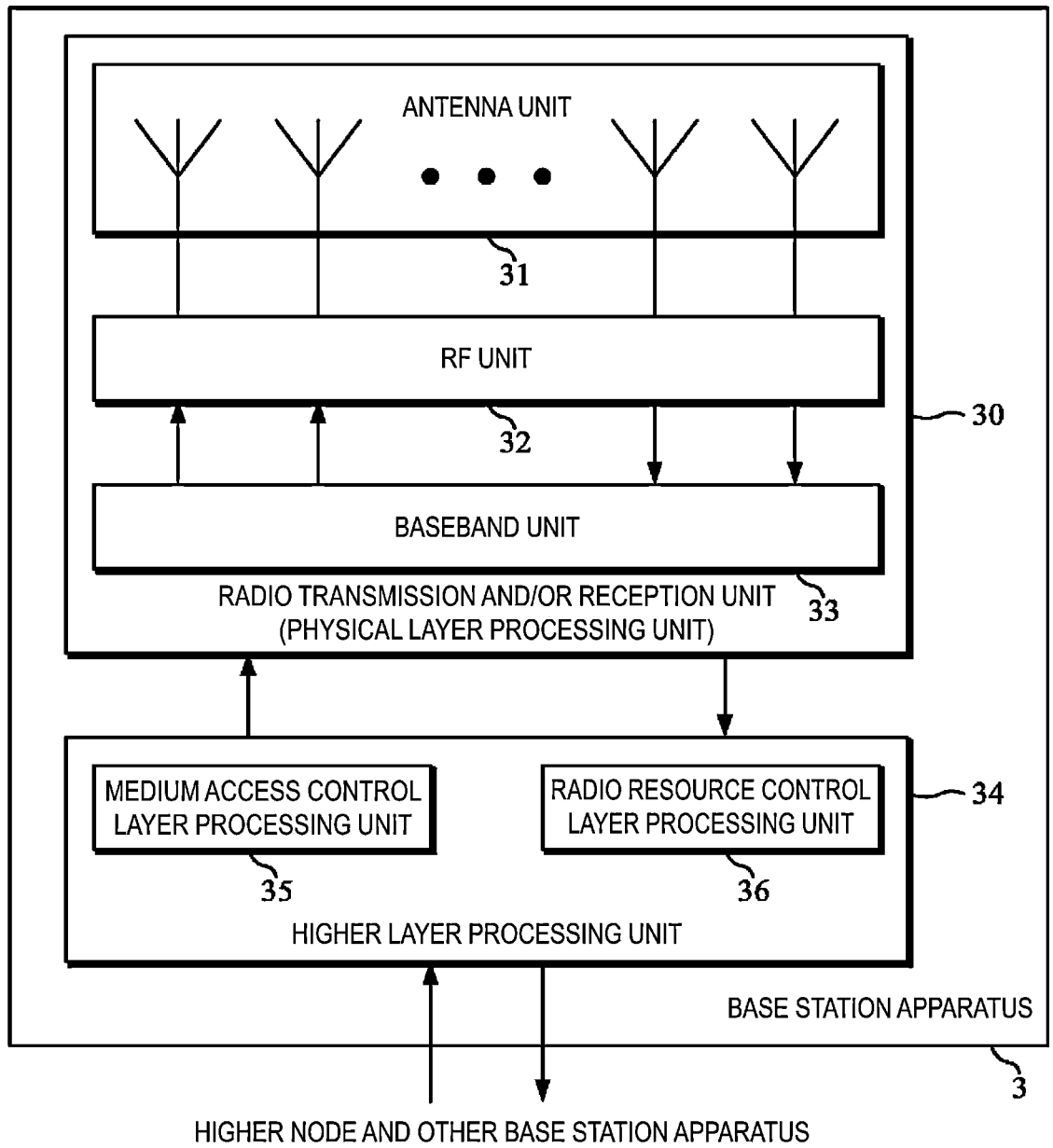
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 at least includes a part or all of a radio transmission and/or reception unit (physical layer processing unit) 30 and/or a higher layer processing unit 34. The radio transmission and/or reception unit 30 at least includes a part or all of an antenna unit 31, a Radio Frequency (RF) unit 32, and a baseband unit 33. The higher layer processing unit 34 at least includes a part or all of a medium access control layer processing unit 35 and a Radio Resource Control (RRC) layer processing unit 36.

The radio transmission and/or reception unit 30 at least includes a part or all of a radio transmitting unit 30a and a radio receiving unit 30b. Here, apparatus configurations of the baseband unit included in the radio transmitting unit 30a and the baseband unit included in the radio receiving unit 30b may be the same or different from each other. Apparatus configurations of the RF unit included in the radio transmitting unit 30a and the RF unit included in the radio receiving unit 30b may be the same or different from each other. Apparatus configurations of the antenna unit included in the radio transmitting unit 30a and the antenna unit included in the radio receiving unit 30b may be the same or different from each other.

For example, the radio transmitting unit 30a may generate and transmit a baseband signal of a PDSCH. For example, the radio transmitting unit 30a may generate and transmit a baseband signal of a PDCCH. For example, the radio transmitting unit 30a may generate and transmit a baseband signal of a PBCH. For example, the radio transmitting unit 30a may generate and transmit a baseband signal of a synchronization signal. For example, the radio transmitting unit 30a may generate and transmit a baseband signal of a PDSCH DMRS. For example, the radio transmitting unit 30a may generate and transmit a baseband signal of a PDCCH DMRS. For example, the radio transmitting unit 30a may generate and transmit a baseband signal of a CSI-RS. For example, the radio transmitting unit 30a may generate and transmit a baseband signal of a DL PTRS.

For example, the radio transmitting unit 30b may receive a PRACH. For example, the radio transmitting unit 30b may receive and demodulate a PUCCH. The radio transmitting unit 30b may receive and demodulate a PUSCH. For example, the radio transmitting unit 30b may receive a PUCCH DMRS. For example, the radio transmitting unit 30b may receive a PUSCH DMRS. For example, the radio transmitting unit 30b may receive a UL PTRS. For example, the radio transmitting unit 30b may receive an SRS.

The higher layer processing unit 34 outputs downlink data (transport block) to the radio transmission and/or reception unit 30 (or the radio transmitting unit 30a). The higher layer processing unit 34 performs processing of a Medium Access Control (MAC) layer, a Packet Data Convergence Protocol (PDCP) layer, a Radio Link Control (RLC) layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 manages various pieces of configuration information/parameters (RRC parameters) of the terminal apparatus 1. The radio resource control layer processing unit 36 sets the RRC parameter, based on an RRC message received from the terminal apparatus 1.

The radio transmission and/or reception unit 30 (or the radio transmitting unit 30a) performs processing such as modulation and coding. The radio transmission and/or reception unit 30 (or the radio transmitting unit 30a) performs modulation, coding, baseband signal generation (conversion into a time-continuous signal) on downlink data to generate a physical signal, and transmits the physical signal to the terminal apparatus 1. The radio transmission and/or reception unit 30 (or the radio transmitting unit 30a) may map the physical signal to a certain component carrier, and transmit the mapped physical signal to the terminal apparatus 1.

The radio transmission and/or reception unit 30 (or the radio receiving unit 30b) performs processing such as demodulation and decoding. The radio transmission and/or reception unit 30 (or the radio receiving unit 30b) separates, demodulates, and decodes a received physical signal, and outputs decoded information to the higher layer processing unit 34. The radio transmission and/or reception unit 30 (or the radio receiving unit 30b) may perform a channel access procedure prior to transmission of the physical signal.

The RF unit 32 converts (down converts) a signal received via the antenna unit 31 into a baseband signal by means of orthogonal demodulation, and removes unnecessary frequency components. The RF unit 32 outputs a processed analog signal to the baseband unit.

The baseband unit 33 converts an analog signal input from the RF unit 32 into a digital signal. The baseband unit 33 removes a portion corresponding to a Cyclic Prefix (CP) from the converted digital signal, performs a Fast Fourier Transform (FFT) on the signal from which the CP has been removed, and extracts a signal in the frequency domain.

The baseband unit 33 performs inverse fast Fourier transform (IFFT) on data to generate an OFDM symbol, adds a CP to the generated OFDM symbol, generates a baseband digital signal, and converts the baseband digital signal into an analog signal. The baseband unit 33 outputs the converted analog signal to the RF unit 32.

The RF unit 32 removes an unnecessary frequency component from the analog signal input from the baseband unit 33 by using a low-pass filter, up converts the analog signal into a carrier frequency, and transmits the converted analog signal via the antenna unit 31. The RF unit 32 may have a function of controlling transmission power. The RF unit 32 is also referred to as a transmission power control unit.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization (Reconfiration with synchronization).

The SCell may be included in one of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP, and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP, and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain time, one downlink BWP may be active.

Among one or multiple uplink BWPs configured for the serving cell, two or more uplink BWPs need not be configured for the active uplink BWP. For the serving cell, at certain time, one uplink BWP may be active.

Figure 6:
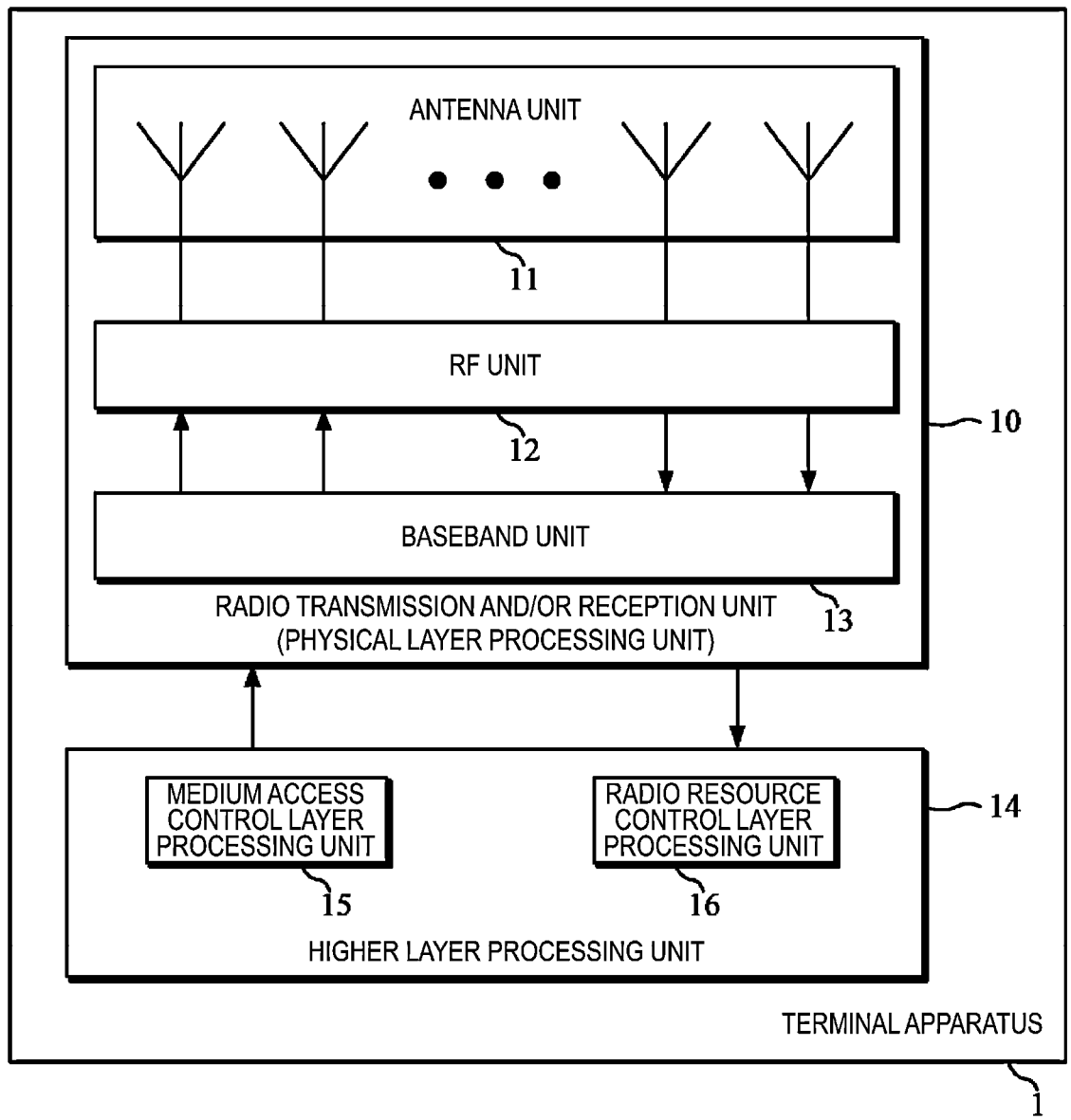
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 at least includes one or all of a radio transmission and/or reception unit (physical layer processing unit) 10 and a higher layer processing unit 14. The radio transmission and/or reception unit 10 at least includes a part or all of an antenna unit 11, an RF unit 12, and a baseband unit 13. The higher layer processing unit 14 at least includes a part or all of a medium access control layer processing unit 15 and a radio resource control layer processing unit 16.

The radio transmission and/or reception unit 10 at least includes a part or all of a radio transmitting unit 10a and a radio receiving unit 10b. Here, apparatus configurations of the baseband unit 13 included in the radio transmitting unit 10a and the baseband unit 13 included in the radio receiving unit 10b may be the same or different from each other. Apparatus configurations of the RF unit 12 included in the radio transmitting unit 10a and the RF unit 12 included in the radio receiving unit 10b may be the same or different from each other. Apparatus configurations of the antenna unit 11 included in the radio transmitting unit 10a and the antenna unit 11 included in the radio receiving unit 10b may be the same or different from each other.

For example, the radio transmitting unit 10a may generate and transmit a baseband signal of a PRACH. For example, the radio transmitting unit 10a may generate and transmit a baseband signal of a PUCCH. The radio transmitting unit 10a may generate and transmit a baseband signal of a PUSCH. For example, the radio transmitting unit 10a may generate and transmit a baseband signal of a PUCCH DMRS. For example, the radio transmitting unit 10a may generate and transmit a baseband signal of a PUSCH DMRS. For example, the radio transmitting unit 10a may generate and transmit a baseband signal of a UL PTRS. For example, the radio transmitting unit 10a may generate and transmit a baseband signal of an SRS.

For example, the radio receiving unit 10b may receive and demodulate a PDSCH. For example, the radio receiving unit 10b may receive and demodulate a PDCCH. For example, the radio receiving unit 10b may receive and demodulate a PBCH. For example, the radio receiving unit 10b may receive a synchronization signal. For example, the radio receiving unit 10b may receive a PDSCH DMRS. For example, the radio receiving unit 10b may receive a PDCCH DMRS. For example, the radio receiving unit 10b may receive a CSI-RS. For example, the radio receiving unit 10b may receive a DL PTRS.

The higher layer processing unit 14 outputs uplink data (transport block) to the radio transmission and/or reception unit 10 (or the radio transmitting unit 10a). The higher layer processing unit 14 performs processing of the MAC layer, the packet data convergence protocol layer, the radio link control layer, and the RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various pieces of configuration information/parameters (RRC parameters) of the terminal apparatus 1. The radio resource control layer processing unit 16 sets the RRC parameters, based on an RRC message received from the base station apparatus 3.

The radio transmission and/or reception unit 10 (or the radio transmitting unit 10a) performs processing such as modulation and coding. The radio transmission and/or reception unit 10 (or the radio transmitting unit 10a) performs modulation, coding, baseband signal generation (conversion into a time-continuous signal) on uplink data to generate a physical signal, and transmits the physical signal to the base station apparatus 3. The radio transmission and/or reception unit 10 (or the radio transmitting unit 10a) may map the physical signal to a certain BWP (active uplink BWP), and transmit the mapped physical signal to the base station apparatus 3.

The radio transmission and/or reception unit 10 (or the radio receiving unit 10b) performs processing such as demodulation and decoding. The radio transmission and/or reception unit 10 (or the radio receiving unit 30b) may receive a physical signal in a certain BWP (active downlink BWP) of a certain serving cell. The radio transmission and/or reception unit 10 (or the radio receiving unit 10b) separates, demodulates, and decodes the received physical signal, and outputs decoded information to the higher layer processing unit 14. The radio transmission and/or reception unit 10 (radio receiving unit 10b) may perform a channel access procedure prior to transmission of the physical signal.

The RF unit 12 converts (down converts) a signal received via the antenna unit 11 into a baseband signal by means of orthogonal demodulation, and removes an unnecessary frequency component. The RF unit 12 outputs a processed analog signal to the baseband unit 13.

The baseband unit 13 converts an analog signal input from the RF unit 12 into a digital signal. The baseband unit 13 removes a portion corresponding to a Cyclic Prefix (CP) from the converted digital signal, performs Fast Fourier Transform (FFT) on the signal from which the CP has been removed, and extracts a signal in the frequency domain.

The baseband unit 13 performs inverse fast Fourier transform (IFFT) on uplink data to generate an OFDM symbol, adds a CP to the generated OFDM symbol, generates a baseband digital signal, and converts the baseband digital signal into an analog signal. The baseband unit 13 outputs the converted analog signal to the RF unit 12.

The RF unit 12 removes an unnecessary frequency component from the analog signal input from the baseband unit 13 by using a low-pass filter, up converts the analog signal into a carrier frequency, and transmits the up converted signal via the antenna unit 11. The RF unit 12 may have a function of controlling transmission power. The RF unit 12 is also referred to as a transmission power control unit.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information generated in a higher layer. The uplink physical channel may be a physical channel used in the uplink component carrier. The uplink physical channel may be transmitted by the terminal apparatus 1. The uplink physical channel may be received by the base station apparatus 3. In the radio communication system according to an aspect of the present embodiment, at least a part or all of the following uplink physical channels may be used.

Physical Uplink Control CHannel (PUCCH)
Physical Uplink Shared CHannel (PUSCH)
Physical Random Access CHannel (PRACH)

The PUCCH (PUCCH resource) may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) at least includes a part or all of Channel State Information (CSI), a Scheduling Request (SR), and Hybrid Automatic Repeat request Acknowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as an HARQ-ACK information bit or an HARQ-ACK information sequence.

The HARQ-ACK information may at least include an HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared Channel (PUSCH)). The HARQ-ACK may indicate an acknowledgement (ACK) or a negative-acknowledgement (NACK) corresponding to the transport block. The ACK may indicate that decoding of the transport block has been completed successfully (has been decoded). The NACK may indicate that decoding of the transport block has not completed successfully (has not been decoded). The HARQ-ACK information may include an HARQ-ACK codebook including one or multiple HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for initial transmission (new transmission). The scheduling request bit may be used for indicating one of a positive SR or a negative SR. The fact that the scheduling request bit indicates a positive SR is also described as "a positive SR is transmitted". The positive SR may indicate that a resource of the PUSCH (or the UL-SCH) for initial transmission is requested by the terminal apparatus 1. The positive SR may indicate that a scheduling request is triggered by a higher layer. The positive SR may be transmitted in a case that transmission of a scheduling request is indicated by a higher layer. The fact that the scheduling request bit indicates a negative SR is also described as "a negative SR is transmitted". The negative SR may indicate that a resource of the PUSCH (or the UL-SCH) for initial transmission is not requested by the terminal apparatus 1. The negative SR may indicate that the scheduling request is not triggered by a higher layer. The negative SR may be transmitted in a case that transmission of a scheduling request is not indicated by a higher layer.

The channel state information may include at least some or all of a Channel Quality Indicator (CQI), a Precoder Matrix Indicator (PMI), and a Rank Indicator (RI). The CQI is an indicator related to quality (for example, propagation strength) of a channel or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1, based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,v}(n)$ is defined by $x_{u,v}(n)=x_u(mod(n+C_v, L_{RA}))$. $x_u$ may be a Zadoff-Chu (ZC) sequence. $x_u$ is defined by $x_u=\exp(-j\pi u i(i+1)/L_{RA})$. j is an imaginary unit. π is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. The random access preamble is identified (determined, given) based at least on the cyclic shift $C_v$ of the PRACH sequence and the sequence index u for the PRACH sequence.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the radio communication system according to an aspect of the present embodiment, at least a part or all of the following uplink physical signals may be used.

UpLink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated by one DCI format (or may be scheduled). The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a channel (propagation path) of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated by one DCI format (or may be triggered). Mapping of the PUCCH to resource elements (resource element mapping) and/or mapping of the DMRS for the PUCCH to resource elements may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a channel of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or multiple higher layer parameters.

The physical layer control information includes 8 bits. The physical layer control information may at least include a part or all of the following 0A to 0D.

0A) Radio frame bit
0B) Half radio frame (half system frame, half frame) bit
0C) SS/PBCH block index bit
0D) Subcarrier offset bit The radio frame bit is used for indicating a radio frame in which the PBCH is transmitted (radio frame including a slot in which the PBCH is transmitted). The radio frame bit includes 4 bits. The radio frame bit may include 4 bits of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

DCI format 0_0, DCI format 0_1, DCI format 1_0, and DCI format 1_1 are DCI formats including a set of fields different from each other. An uplink DCI format is a general term for DCI format 0_0 and DCI format 0_1. A downlink DCI format is a general term for DCI format 1_0 and DCI format 1_1.

DCI format 0_0 is at least used for scheduling the PUSCH of a certain cell (or mapped to a certain cell). DCI format 0_0 at least includes a part or all of fields from 1A to 1E.
  1A) DCI format identification field (Identifier field for DCI formats)
  1B) Frequency domain resource assignment field
  1C) Time domain resource assignment field
  1D) Frequency hopping flag field
  1E) Modulation and Coding Scheme field (MCS field)

The DCI format identification field may indicate whether the DCI format including the DCI format identification field is an uplink DCI format or a downlink DCI format. The DCI format identification field included in DCI format 0_0 may indicate 0 (or may indicate that DCI format 0_0 is an uplink DCI format).

The frequency domain resource assignment field included in DCI format 0_0 may be at least used for indicating allocation of frequency resources for the PUSCH.

The time domain resource assignment field included in DCI format 0_0 may be at least used for indicating allocation time resources for the PUSCH.

The frequency hopping flag field may be at least used for indicating whether or not frequency hopping is applied to the PUSCH.

The MCS field included in DCI format 0_0 may be at least used for indicating a part or all of a modulation scheme for the PUSCH and/or a target coding rate. The target coding rate may be a target coding rate for the transport block of the PUSCH. The size of the transport block (Transport Block Size (TBS)) of the PUSCH may be given based at least on a part or all of the target coding rate and the modulation scheme for the PUSCH.

DCI format 0_0 need not include a field used for a CSI request. In other words, CSI need not be requested using DCI format 0_0.

DCI format 0_0 need not include a carrier indicator field. In other words, the uplink component carrier to which the PUSCH scheduled using DCI format 0_0 is mapped may be the same as the uplink component carrier to which the PDCCH including DCI format 0_0 is mapped.

DCI format 0_0 need not include the BWP field. In other words, the uplink BWP to which the PUSCH scheduled using DCI format 0_0 is mapped may be the same as the uplink BWP to which the PDCCH including DCI format 0_0 is mapped.

DCI format 0_1 is at least used for scheduling of the PUSCH of a certain cell (mapped to a certain cell). DCI format 0_1 at least includes a part or all of fields of 2A to 2H.
  2A) DCI format identification field
  2B) Frequency domain resource assignment field
  2C) Uplink time domain resource assignment field
  2D) Frequency hopping flag field
  2E) MCS field
  2F) CSI request field
  2G) BWP field
  2H) Carrier indicator field The DCI format identification field included in DCI format 0_1 may indicate 0 (or may indicate that DCI format 0_1 is an uplink DCI format).

The frequency domain resource assignment field included in DCI format 0_1 may be at least used for indicating allocation of frequency resources for the PUSCH.

The time domain resource assignment field included in DCI format 0_1 may be at least used for indicating allocation time resources for the PUSCH.

The MCS field included in DCI format 0_1 may be at least used for indicating a part or all of a modulation scheme for the PUSCH and/or a target coding rate.

In a case that the BWP field is included in DCI format 0_1, the BWP field may be used for indicating an uplink BWP to which the PUSCH is mapped. In a case that the BWP field is not included in DCI format 0_1, the uplink BWP to which the PUSCH is mapped may be the same as the uplink BWP to which the PDCCH including DCI format 0_1 used for scheduling of the PUSCH is mapped. In a case that the number of uplink BWPs configured for the terminal apparatus 1 in a certain uplink component carrier is two or more, the number of bits of the BWP field included in DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in DCI format 0_1 used for scheduling of the PUSCH mapped to the certain uplink component carrier may be 0 bits (or the BWP field need not be included in DCI format 0_1 used for scheduling of the PUSCH mapped to the certain uplink component carrier).

The CSI request field is at least used for indicating reporting of the CSI.

In a case that the carrier indicator field is included in DCI format 0_1, the carrier indicator field may be used for indicating the uplink component carrier to which the PUSCH is mapped. In a case that the carrier indicator field is not included in DCI format 0_1, the uplink component carrier to which the PUSCH is mapped may be the same as the uplink component carrier to which the PDCCH including DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in DCI format 0_1 used for scheduling of the PUSCH mapped to the certain serving cell group may be 0 bits (or the carrier indicator field need not be included in DCI format 0_1 used for scheduling of the PUSCH mapped to the certain serving cell group).

DCI format 1_0 is at least used for scheduling of the PDSCH of a certain cell (mapped to a certain cell). DCI format 1_0 at least includes a part or all of 3A to 3F.
  3A) DCI format identification field
  3B) Frequency domain resource assignment field
  3C) Time domain resource assignment field
  3D) MCS field
  3E) PDSCH_HARQ feedback timing indication field (PDSCH to HARQ feedback timing indicator field)
  3F) PUCCH resource indication field (PUCCH resource indicator field)

The DCI format identification field included in DCI format 1_0 may indicate 1 (or may indicate that DCI format 1_0 is a downlink DCI format).

The frequency domain resource assignment field included in DCI format 1_0 may be at least used for indicating allocation of frequency resources for the PDSCH.

The time domain resource assignment field included in DCI format 1_0 may be at least used for indicating allocation of time resources for the PDSCH.

The MCS field included in DCI format 1_0 may be at least used for indicating a part or all of a modulation scheme for the PDSCH and/or a target coding rate. The target coding rate may be a target coding rate for the transport block of the PDSCH. The size of the transport block (Transport Block Size (TBS)) of the PDSCH may be given based at least on a part or all of the target coding rate and the modulation scheme for the PDSCH.

The PDSCH_HARQ feedback timing indication field may be at least used for indicating an offset from the slot including the last OFDM symbol of the PDSCH to the slot including the first OFDM symbol of the PUCCH.

The PUCCH resource indication field may be a field indicating an index of one of one or multiple PUCCH resources included in a PUCCH resource set. The PUCCH resource set may include one or multiple PUCCH resources.

DCI format 1_0 need not include the carrier indicator field. In other words, the downlink component carrier to which the PDSCH scheduled using DCI format 1_0 is mapped may be the same as the downlink component carrier to which the PDCCH including DCI format 1_0 is mapped.

DCI format 1_0 need not include the BWP field. In other words, the downlink BWP to which the PDSCH scheduled using DCI format 1_0 is mapped may be the same as the downlink BWP to which the PDCCH including DCI format 1_0 is mapped.

DCI format 1_1 is at least used for scheduling the PDSCH of a certain cell (or mapped to a certain cell). DCI format 1_1 at least includes a part or all of 4A to 4I.
  4A) DCI format identification field
  4B) Frequency domain resource assignment field
  4C) Time domain resource assignment field
  4E) MCS field
  4F) PDSCH_HARQ feedback timing indication field
  4G) PUCCH resource indication field
  4H) BWP field
  4I) Carrier indicator field The DCI format identification field included in DCI format 1_1 may indicate 1 (or may indicate that DCI format 1_1 is a downlink DCI format).

The frequency domain resource assignment field included in DCI format 1_1 may be at least used for indicating allocation of frequency resources for the PDSCH.

The time domain resource assignment field included in DCI format 1_1 may be at least used for indicating allocation of time resources for the PDSCH.

The MCS field included in DCI format 1_1 may be at least used for indicating a part or all of the modulation scheme for the PDSCH and/or the target coding rate.

In a case that the PDSCH_HARQ feedback timing indication field is included in DCI format 1_1, the PDSCH_HARQ feedback timing indication field may be at least used for indicating an offset from the slot including the last OFDM symbol of the PDSCH to the slot including the first OFDM symbol of the PUCCH. In a case that the PDSCH_HARQ feedback timing indication field is not included in DCI format 1_1, an offset from the slot including the last OFDM symbol of the PDSCH to the slot including the first OFDM symbol of the PUCCH may be identified by a higher layer parameter.

The PUCCH resource indication field may be a field indicating an index of one of one or multiple PUCCH resources included in a PUCCH resource set.

In a case that the BWP field is included in DCI format 1_1, the BWP field may be used for indicating the downlink BWP to which the PDSCH is mapped. In a case that the BWP field is not included in DCI format 1_1, the downlink BWP to which the PDSCH is mapped may be the same as the downlink BWP to which the PDCCH including DCI format 1_1 used for scheduling of the PDSCH is mapped. In a case that the number of downlink BWPs configured for the terminal apparatus 1 in a certain downlink component carrier is two or more, the number of bits of the BWP field included in DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in DCI format 1_1 used for scheduling of the PDSCH mapped to the certain downlink component carrier may be 0 bits (or the BWP field need not be included in DCI format 1_1 used for scheduling of the PDSCH mapped to the certain downlink component carrier).

In a case that the carrier indicator field is included in DCI format 1_1, the carrier indicator field may be used for indicating the downlink component carrier to which the PDSCH is mapped. In a case that the carrier indicator field is not included in DCI format 1_1, the downlink component carrier to which the PDSCH is mapped may be the same as the downlink component carrier to which the PDCCH including DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in DCI format 1_1 used for scheduling of the PDSCH mapped to the certain serving cell group may be 0 bits (or the carrier indicator field need not be included in DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the radio communication system according to an aspect of the present embodiment, at least a part or all of the following downlink physical signals may be used.

Synchronization signal (SS)
DownLink DeModulation Reference Signal (DL DMRS)
Channel State Information-Reference Signal (CSI-RS)
DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
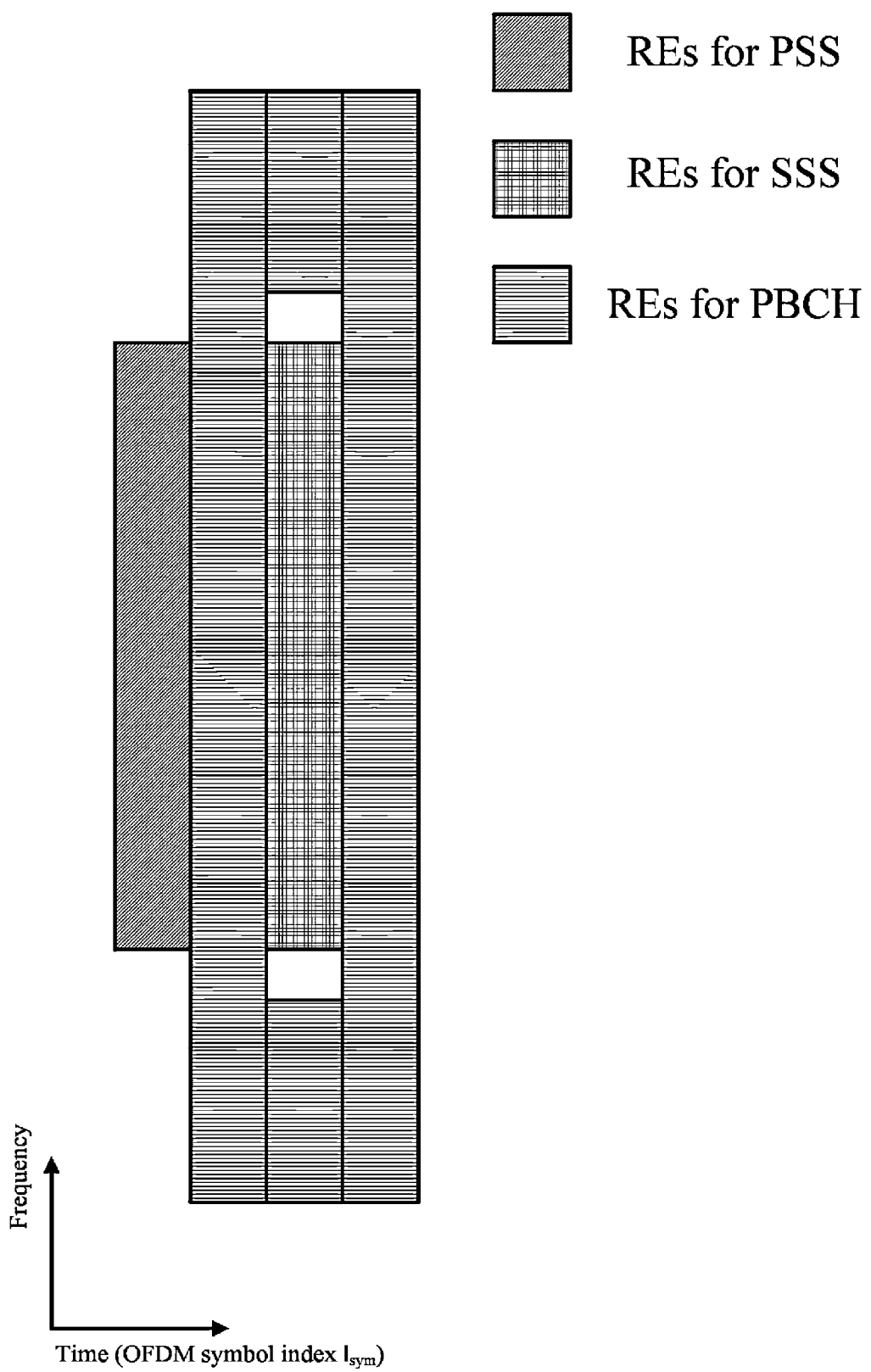
FIG. 7 is a diagram illustrating a configuration example of an SS/PBCH block according to an aspect of the present embodiment.

FIG. 7 is a diagram illustrating a configuration example of the SS/PBCH block according to an aspect of the present embodiment. In FIG. 7, the horizontal axis corresponds to a time axis (OFDM symbol index $l_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four continuous OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH on which the symbol of the PBCH in a certain antenna port is conveyed may be inferred by the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a channel of the PDSCH may be inferred from the DMRS for the PDSCH. In a case that a set of resource elements in which the symbol of a certain PDSCH and a set of resource elements in which the symbol of the DMRS for the certain PDSCH is conveyed are included in the same Precoding Resource Group (PRG), the PDSCH on which the symbol of the PDSCH in a certain antenna port is conveyed may be inferred by the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a channel of the PDCCH may be inferred from the DMRS for the PDCCH. In a case that the same precoder is applied to a set of resource elements in which the symbol of a certain PDCCH is conveyed and a set of resource elements in which the symbol of the DMRS for the certain PDCCH is conveyed (assumed to be applied), the PDCCH on which the symbol of the PDCCH in a certain antenna port is conveyed may be inferred by the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. A Common Control CHannel (CCCH) may be used for transmitting a common RRC message in multiple terminal apparatuses 1. Here, the CCCH may be, for example, used for the terminal apparatus 1 with which RRC connection is not established. A Dedicated Control CHannel (DCCH) may be at least used for transmitting a dedicated RRC message to the terminal apparatus 1. Here, the DCCH may be, for example, used for the terminal apparatus 1 with which RRC connection is established.

The RRC message includes one or multiple RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a specific RRC message. For example, the system information may be SIB1 (SystemInformationBlock Type 1).

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Control Element (MAC CE). In other words, the higher layer parameter is a general term for an MIB, system information, a message corresponding to the CCCH, a message corresponding to the DCCH, and information included in the MAC CE.

Procedures performed by the terminal apparatus 1 at least include a part or all of the following 5A to 5C.

5A) Cell search
5B) Random access
5C) Data communication

The cell search is a procedure in which synchronization with a certain cell related to the time domain and the frequency domain is performed by the terminal apparatus 1, which is used for detecting a physical cell identity (physical cell ID). In other words, the terminal apparatus 1 may perform synchronization with a certain cell in the time domain and the frequency domain by means of cell search, and detect a physical cell ID.

A sequence of the PSS is given based at least on the physical cell ID. A sequence of the SSS is given based at least on the physical cell ID.

An SS/PBCH block candidate indicates a resource allowed to (capable of, scheduled to, configured to, defined to, having a possibility of) transmit the SS/PBCH block.

A set of SS/PBCH block candidates in a certain half radio frame is also referred to as an SS burst set. The SS burst set is also referred to as a transmission window, an SS transmission window, or a Discovery Refeence Signal transmission window (DRS transmission window). The SS burst set is a general term at least including a first SS burst set and a second SS burst set.

The base station apparatus 3 transmits SS/PBCH blocks with one or multiple indexes in a prescribed period. The terminal apparatus 1 may detect at least one SS/PBCH block out of the SS/PBCH blocks with one or multiple indexes, and attempt decoding of the PBCH included in the SS/PBCH block.

The random access is a procedure at least including a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions, based at least on the index of the SS/PBCH block candidate detected based on cell search.

A configuration of the PRACH occasion may at least include a part or all of a PRACH configuration period (PCF) $T_{PCF}$, the number $N^{PCF}_{RO, t}$ of PRACH occasions included in a certain PRACH configuration period in the time domain, the number $N_{RO, f}$ of PRACH occasions included in the frequency domain, the number $N^{RO}_{preamble}$ of random access preambles allocated for random access for each PRACH occasion, the number $N^{SSB}_{preamble, CBRA}$ of preambles allocated for each index of the SS/PBCH block candidate for Contention Based Random Access (CBRA), and the number $N^{SSB}_{RO}$ of PRACH occasions allocated for each index of the SS/PBCH block candidate for contention based random access.

Based at least on the configuration of the PRACH occasion, a part or all of time resources and frequency resources of a certain PRACH occasion may be given.

A relationship (association) between the index of the SS/PBCH block candidate corresponding to the SS/PBCH block detected by the terminal apparatus 1 and the PRACH occasion may be given based at least on first bitmap information (first bitmap) indicating the index of the SS/PBCH block candidate actually used for transmission of the SS/PBCH block. Based at least on the first bitmap information indicating the index of the SS/PBCH block candidate actually used for transmission of the SS/PBCH block, the terminal apparatus 1 may determine a relationship (association) between the index of the SS/PBCH block candidate corresponding to the SS/PBCH block detected by the terminal apparatus 1 and the PRACH occasion. Each element of the first bitmap information may correspond to the index of a certain SS/PBCH block candidate. For example, the first element of the first bitmap information may correspond to the SS/PBCH block candidate whose index of the SS/PBCH block candidate is 0. For example, the second element of the first bitmap information may correspond to the SS/PBCH block candidate whose index of the SS/PBCH block candidate is 1. For example, the $L_{SSB}$-th element of the first bitmap information may correspond to the SS/PBCH block candidate whose index of the SS/PBCH block candidate is $L_{SSB}-1$. $L_{SSB}$ is the number of SS/PBCH blocks included in one SS burst set (for example, the first SS burst set).

Figure 8:
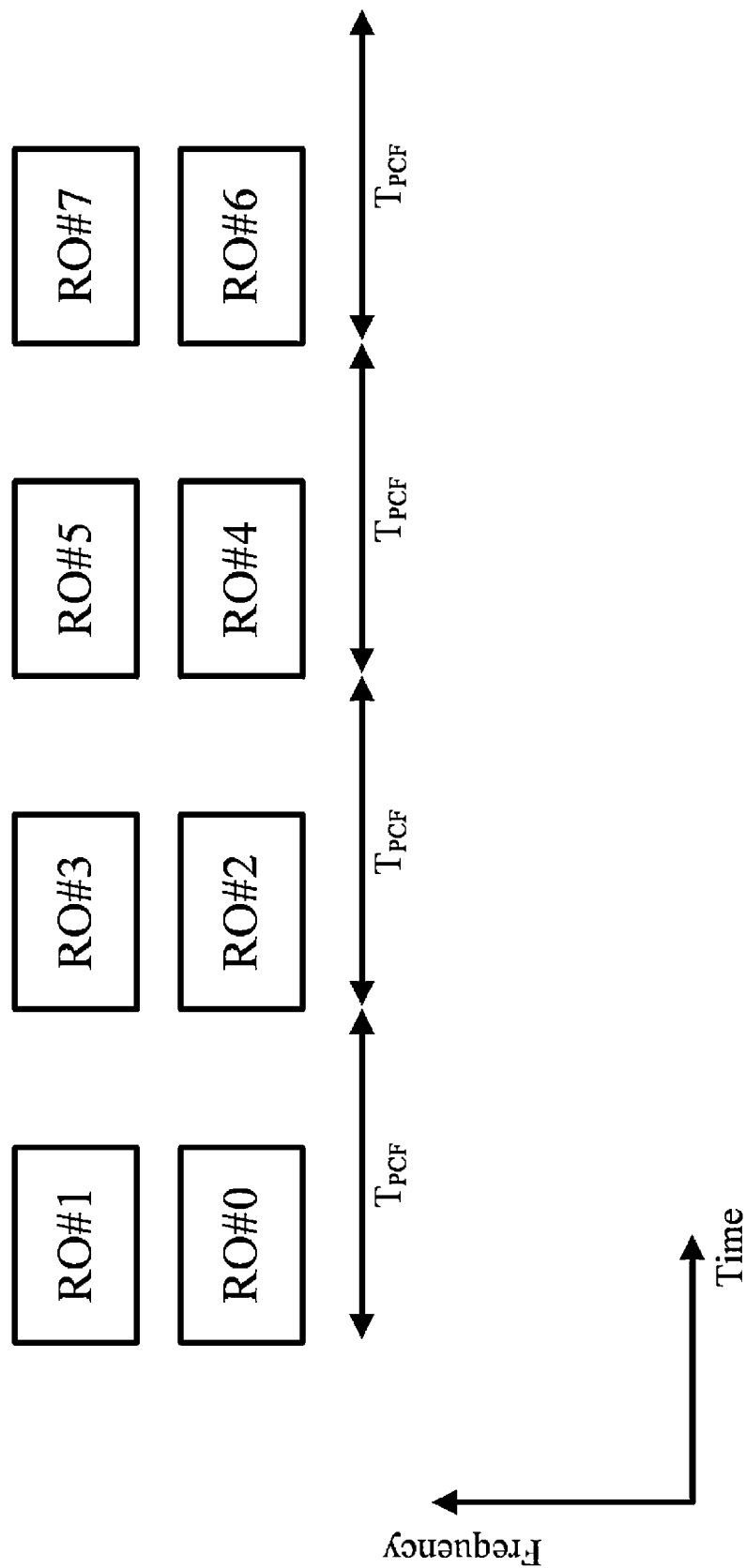
FIG. 8 is a diagram illustrating a configuration example of PRACH resources according to an aspect of the present embodiment.

FIG. 8 is a diagram illustrating a configuration example of PRACH resources according to an aspect of the present embodiment. In FIG. 8, the PRACH configuration period $T_{PCF}$ is 40 ms, the number $N^{PCF}_{RO,\,t}$ of PRACH occasions included in a certain PRACH configuration period in the time domain is 1, and the number $N_{RO,\,f}$ of PRACH occasions included in the frequency domain is configured to 2.

For example, the first bitmap information (ssb-PositionInBurst) indicating the index of the SS/PBCH block candidate actually used for transmission of the SS/PBCH block is set to {1, 1, 0, 1, 0, 1, 0, 0}.

Figure 9:
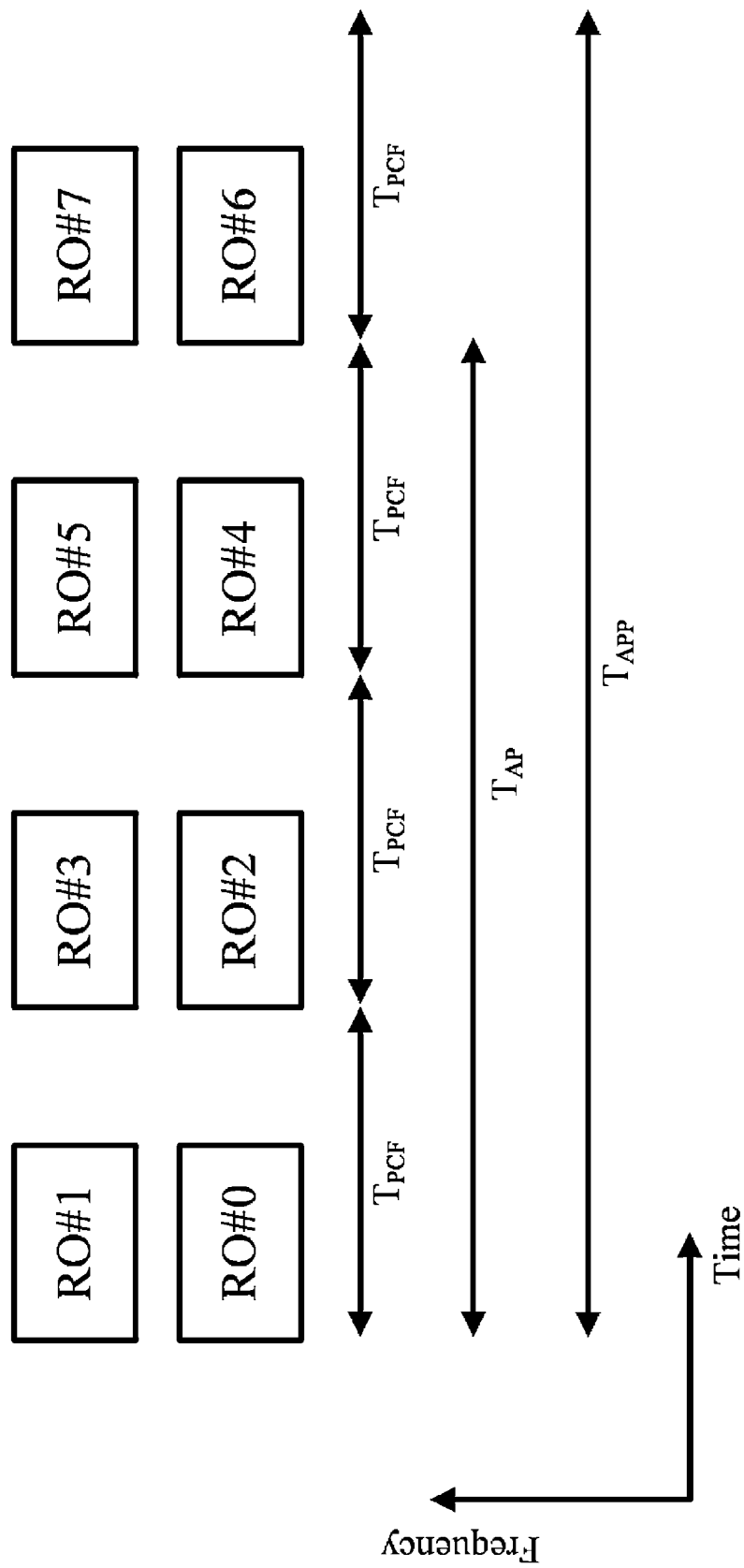
FIG. 9 is a diagram illustrating an example of a relationship (SS-RC) association) between an index of an SS/PBCH block candidate and a PRACH occasion in a case that 1) the number $N^{RO}_{preamble}$ of random access preambles allocated for random access for each PRACH occasion is 64, 2) the number $N^{SSB}_{preamble, CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) first bitmap information is set to {1, 1, 0, 1, 0, 1, 1, 0} according to an aspect of the present embodiment.

FIG. 9 is a diagram illustrating an example of a relationship (SS-RO association) between the index of the SS/PBCH block candidate and the PRACH occasion in a case that 1) the number $N^{RO}_{preamble}$ of random access preambles allocated for random access for each PRACH occasion is 64, 2) the number $N^{SSB}_{preamble,\,CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) the first bitmap information is set to {1, 1, 0, 1, 0, 1, 1, 0} according to an aspect of the present embodiment. In FIG. 9, it is assumed that the configuration of the PRACH occasion is the same as that of FIG. 8. In FIG. 9, the SS/PBCH block candidate having an index of 0 may correspond to the PRACH occasion (RO #0) having an index of 0, the SS/PBCH block candidate having an index of 1 may correspond to the PRACH occasion (RO #1) having an index of 1, the SS/PBCH block candidate having an index of 3 may correspond to the PRACH occasion (RO #2) having an index of 2, the SS/PBCH block candidate having an index of 5 may correspond to the PRACH occasion (RO #3) having an index of 3, and the SS/PBCH block candidate having an index of 6 may correspond to the PRACH occasion (RO #4)) having an index of 4. In FIG. 9, a PRACH association period (PRACH AP) $T_{AP}$ is 120 ms including the PRACH occasions (RO #0 to RO #5) from index 0 to index 4. In FIG. 9, a PRACH Association Pattern Period (PRACH APP) $T_{APP}$ is 160 ms. In FIG. 9, the PRACH association pattern period includes one PRACH association period.

Figure 10:
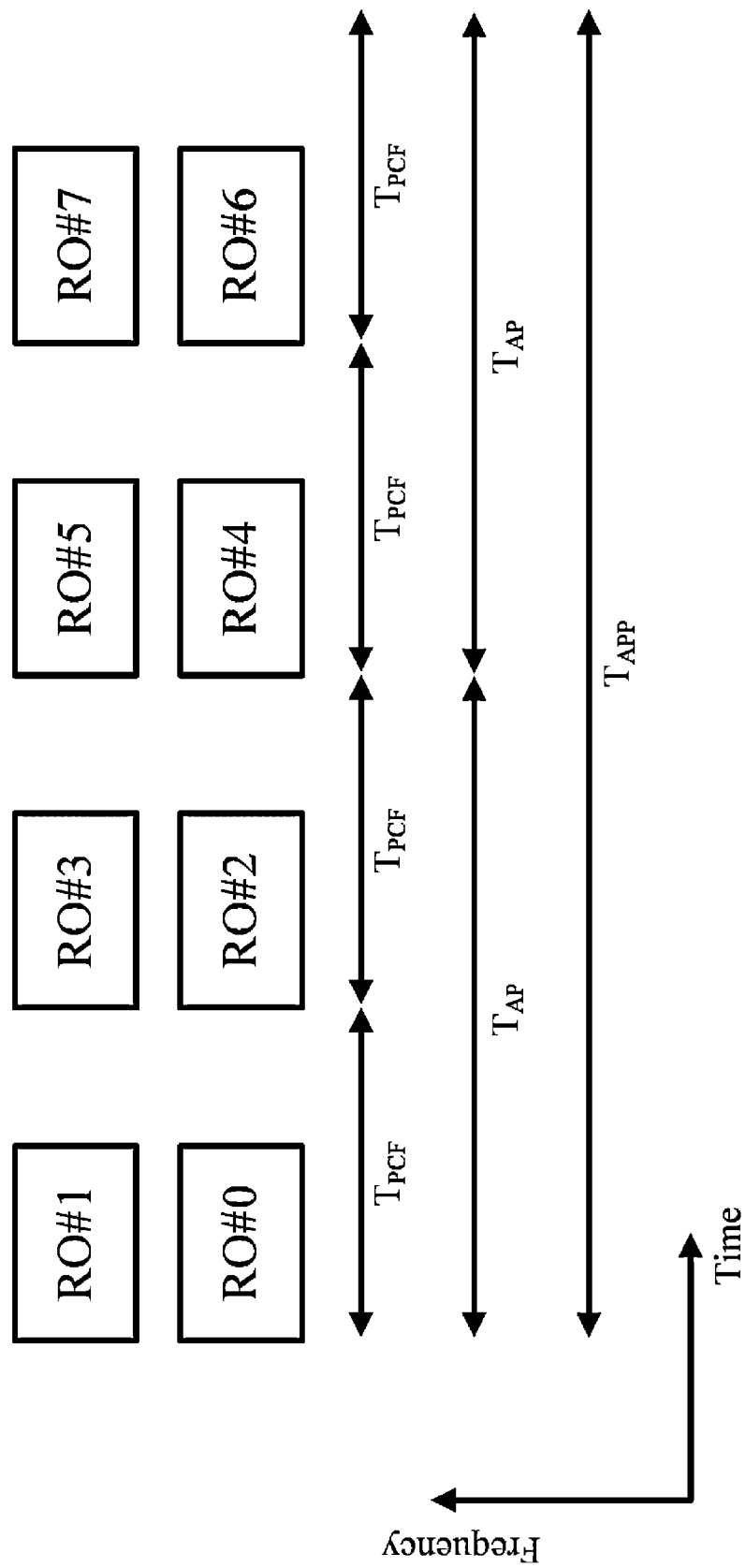
FIG. 10 is a diagram illustrating an example of a relationship between the index of the SS/PBCH block candidate and the PRACH occasion in a case that 1) the number $N^{RO}_{preamble}$ of random access preambles allocated for random access for each PRACH occasion is 64, 2) the number $N^{SSB}_{preamble, CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) the first bitmap information is set to {1, 1, 0, 1, 0, 1, 0, 0} according to an aspect of the present embodiment.

FIG. 10 is a diagram illustrating an example of a relationship between the index of the SS/PBCH block candidate and the PRACH occasion in a case that 1) the number $N^{RO}_{preamble}$ of random access preambles allocated for random access for each PRACH occasion is 64, 2) the number $N^{SSB}_{preamble,\,CBRA}$ of preambles allocated for each index of the SS/PBCH block candidate for contention based random access is 64, 3) the number $N^{SSB}_{RO}$ of PRACH occasions allocated for each index of the SS/PBCH block candidate for contention based random access is 1, and 4) the first bitmap information is set to {1, 1, 0, 1, 0, 1, 0, 0} according to an aspect of the present embodiment. In FIG. 10, it is assumed that the configuration of the PRACH occasion is the same as that of FIG. 8. In FIG. 10, the SS/PBCH block candidate having an index of 0 may correspond to the PRACH occasion (RO #0) having an index of 0 and the PRACH occasion (RO #4) having an index of 4, the SS/PBCH block candidate having an index of 1 may correspond to the PRACH occasion (RO #1) having an index of 1 and the PRACH occasion (RO #5) having an index of 5, the SS/PBCH block candidate having an index of 3 may correspond to the PRACH occasion (RO #2) having an index of 2 and the PRACH occasion (RO #6) having an index of 6, and the SS/PBCH block candidate having an index of 5 may correspond to the PRACH occasion (RO #3) having an index of 3 and the PRACH occasion (RO #7) having an index of 7. In FIG. 10, the PRACH association period $T_{AP}$ is 80 ms including the PRACH occasions (RO #0 to RO #3) from index 0 to index 3. In FIG. 10, the PRACH Association Pattern Period (PRACH APP) $T_{APP}$ is 160 ms. In FIG. 10, the PRACH association pattern period includes two PRACH association periods.

The "SS/PBCH block candidate actually used for transmission of the SS/PBCH block" having the smallest index out of N "SS/PBCH block candidates actually used for transmission of the SS/PBCH block" indicated by the first bitmap information may correspond to the first PRACH occasion (PRACH occasion having an index of 0). The n-th index out of N "SS/PBCH block candidates actually used for transmission of the SS/PBCH block" indicated by the first bitmap information may correspond to the n-th PRACH occasion (PRACH occasion having an index of n−1).

The index of the PRACH occasion is assigned to the PRACH occasion included in the PRACH association pattern period, with the frequency axis being the first priority (Frequency-first time-second).

In a case that all of the N "SS/PBCH block candidates actually used for transmission of the SS/PBCH block" indicated by the first bitmap information are allocated so as to correspond to at least one PRACH occasion, the PRACH configuration period corresponding to at least one of the PRACH occasions corresponding to at least one "SS/PBCH block candidate actually used for transmission of the SS/PBCH block" is included. In FIG. 9, the PRACH occasions corresponding to at least one "SS/PBCH block candidate actually used for transmission of the SS/PBCH block" are RO #0 to RO #4, and the PRACH configuration period corresponding to at least one of the PRACH occasions corresponding to the at least one "SS/PBCH block candidate actually used for transmission of the SS/PBCH block" is the first three PRACH configuration periods. In FIG. 10, the PRACH occasions corresponding to at least one "SS/PBCH block candidate actually used for transmission of the SS/PBCH block" are RO #0 to RO #3, and the PRACH configuration period corresponding to at least one of the PRACH occasions corresponding to the at least one "SS/PBCH block candidate actually used for transmission of the SS/PBCH block" is the first two PRACH configuration periods.

In a case that a maximum integer k satisfying $T_{APP}>k*T_{AP}$ is two or greater, one PRACH association pattern period includes k PRACH association periods. In FIG. 10, the maximum integer k satisfying $T_{APP}>k*T_{AP}$ is 2, the first PRACH association period includes the first two PRACH configuration periods, and the second PRACH association period includes two PRACH configuration periods from the third PRACH configuration period.

The terminal apparatus 1 transmits one random access preamble selected out of the PRACH occasion corresponding to the index of the SS/PBCH block candidate in which the SS/PBCH block is detected.

The message 2 is a procedure in which detection of DCI format 1_0 with a Cyclic Redundancy Check (CRC) scrambled with a Random Access-Radio Network Temporary Identifier (RA-RNTI) by the terminal apparatus 1 is attempted. The terminal apparatus 1 attempts detection of the PDCCH including the DCI format in a control resource set given based on the MIB included in the PBCH included in the SS/PBCH block detected based on cell search, and resources indicated based on a configuration of a search space set.

The message 3 is a procedure in which the PUSCH scheduled using a random access response grant included in DCI format 1_0 detected through the procedure of the message 2 is transmitted. Here, the random access response grant is indicated by the MAC CE included in the PDSCH scheduled using DCI format 1_0.

The PUSCH scheduled based on the random access response grant is one of a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled using DCI format 0_0 with a CRC scrambled based on a Temporary Cell-Radio Network Temporary Identifier (TC-RNTI).

The message 4 is a procedure in which detection of DCI format 1_0 with a CRC scrambled based on one of a Cell-Radio Network Temporary Identifier (C-RNTI) or a TC-RNTI is attempted. The terminal apparatus 1 receives the PDSCH scheduled based on DCI format 1_0. The PDSCH may include a contention resolution ID.

Data communication is a general term for downlink communication and uplink communication.

In data communication, the terminal apparatus 1 attempts detection of the PDCCH (monitors the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping), or may include distributed resources (interleaver mapping).

A set of resource blocks constituting the control resource set may be indicated by a higher layer parameter. The number of OFDM symbols constituting the control resource set may be indicated by a higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set, or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by a higher layer parameter.

For a certain search space set, a part or all of 6A to 6C may be indicated by at least a higher layer parameter.
  6A) Monitoring interval of the PDCCH (PDCCH monitoring periodicity)
  6B) Monitoring pattern of the PDCCH in a slot (PDCCH monitoring pattern within a slot)
  6C) Monitoring offset of the PDCCH (PDCCH monitoring offset)

The monitoring occasion of a certain search space set may correspond to the OFDM symbol to which the first OFDM symbol of the control resource set related to the certain search space set is mapped. The monitoring occasion of a certain search space set may correspond to a resource of the control resource set starting from the first OFDM symbol of the control resource set related to the certain search space set. The monitoring occasion of the search space set is given based at least on a part or all of the monitoring interval of the PDCCH, the monitoring pattern of the PDCCH in a slot, and the monitoring offset of the PDCCH.

Figure 11:
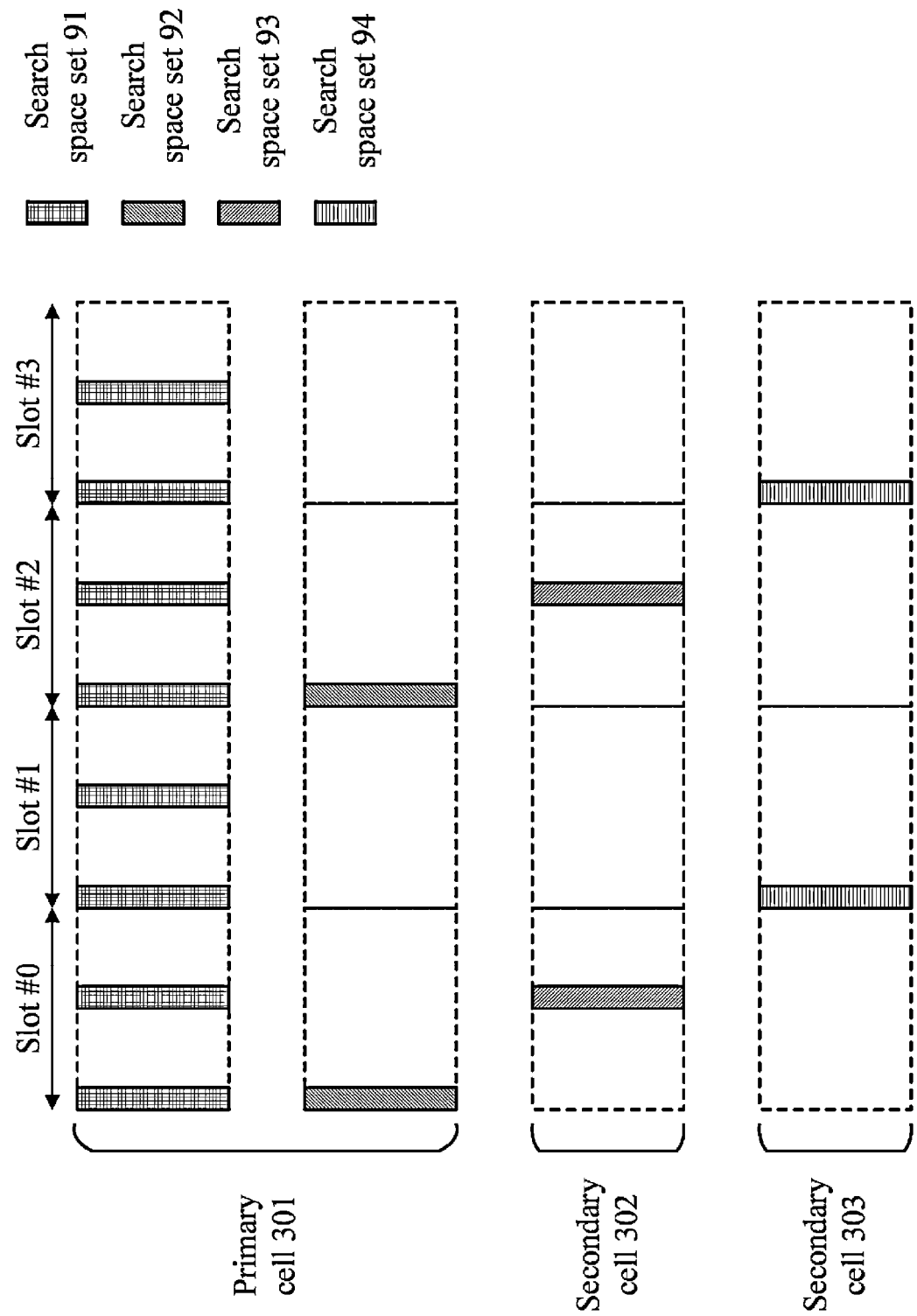
FIG. 11 is a diagram illustrating an example of monitoring occasions of search space sets according to an aspect of the present embodiment.

FIG. 11 is a diagram illustrating an example of the monitoring occasion for the search space set according to an aspect of the present embodiment. In FIG. 11, a search space set 91 and a search space set 92 are configured in a primary cell 301, a search space set 93 is configured in a secondary cell 302, and a search space set 94 is configured in a secondary cell 303.

In FIG. 11, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring interval of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasion for the search space set 91 corresponds to the first OFDM symbol (OFDM symbol #0) and the eighth OFDM symbol (OFDM symbol #7) in each of the slots.

The monitoring interval of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring interval of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring interval of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a CELL-RADIO NETWORK TEMPORARY IDENTIFIER (C-RNTI).

The UE-specific PDCCH search space set may be at least used for the DCI format with a CRC sequence scrambled with a C-RNTI.

In downlink communication, the terminal apparatus 1 detects a downlink DCI format. The detected downlink DCI format is at least used for resource allocation of the PDSCH. The detected downlink DCI format is also referred to as downlink allocation (downlink assignment). The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In uplink communication, the terminal apparatus 1 detects an uplink DCI format. The detected DCI format is at least used for resource allocation of the PUSCH. The detected uplink DCI format is also referred to as an uplink grant. The terminal apparatus 1 performs transmission of the PUSCH.

The base station apparatus 3 and the terminal apparatus 1 may perform a Channel access procedure in a serving cell c, and perform transmission of a transmission wave (Transmission) in the serving cell c. For example, the serving cell c may be a serving cell configured in an Unlicensed band. The transmission wave is a signal transmitted from the base station apparatus 3 or the terminal apparatus 1 to a medium.

The base station apparatus 3 and the terminal apparatus 1 may perform a channel access procedure in a carrier f of the serving cell c, and perform transmission of a transmission wave in the carrier f of the serving cell c. The carrier f is a carrier included in the serving cell c. The carrier f may include a set of resource blocks given based on a higher layer parameter.

The base station apparatus 3 and the terminal apparatus 1 may perform a channel access procedure in the carrier f of the serving cell c, and perform transmission of a transmission wave in a band part b of the carrier f of the serving cell c. The band part b is a subset of bands included in the carrier f.

The base station apparatus 3 and the terminal apparatus 1 may perform a channel access procedure in the band part b of the carrier f of the serving cell c, and perform transmission of a transmission wave in the carrier f of the serving cell c. A fact that transmission of a transmission wave is performed in the carrier f of the serving cell c may mean that the transmission wave is transmitted in one of the band parts included in the carrier f of the serving cell c.

The base station apparatus 3 and the terminal apparatus 1 may perform a channel access procedure in the band part b of the carrier f of the serving cell c, and perform transmission of a transmission wave in the band part b of the carrier f of the serving cell c.

The channel access procedure may at least include one or both of first measurement (first sensing) and a count procedure. A first channel access procedure may include the first measurement. The first channel access procedure need not include the count procedure. A second channel access procedure may at least include both of the first measurement and the count procedure. The channel access procedure is a term including a part or all of the first channel access procedure and the second channel access procedure.

After the first channel access procedure is performed, a transmission wave at least including the SS/PBCH block may be transmitted. After the first channel access procedure is performed, a transmission wave at least including a part or all of the SS/PBCH block, the PDSCH including broadcast information, the PDCCH including the DCI format used for scheduling of the PDSCH, and the CSI-RS may be transmitted. After the second channel access procedure is performed, a transmission wave at least including the PDSCH including information other than broadcast information may be transmitted. The PDSCH including broadcast information may at least include a part or all of the PDSCH including system information, the PDSCH including paging information, and the PDSCH (message 2 and/or message 4) used for random access.

The transmission wave at least including a part or all of the SS/PBCH block, the PDSCH including broadcast information, the PDCCH including the DCI format used for scheduling of the PDSCH, and the CSI-RS is also referred to as a Discovery Reference Signal (DRS). The DRS may be a signal transmitted after the first channel access procedure.

In a case that a period of the DRS is a prescribed length or less, and a duty ratio (duty cycle) of the DRS is a prescribed value or less, a transmission wave including the DRS may be transmitted after the first channel access procedure is performed. In a case that the period of the DRS exceeds the prescribed length, the transmission wave including the DRS may be transmitted after the second channel access procedure is performed. In a case that the duty ratio of the DRS exceeds the prescribed value, the transmission wave including the DRS may be transmitted after the second channel access procedure is performed. For example, the prescribed length may be 1 ms. The prescribed value may be 1/20.

A fact that a transmission wave is transmitted after the channel access procedure is performed may mean that the transmission wave is transmitted based on the channel access procedure. A fact that a transmission wave is transmitted after the channel access procedure is performed may mean that the transmission wave is transmitted in a case that a fact that a channel can be transmitted is given based on the channel access procedure.

The first measurement may be a measurement in which a fact that a Medium is Idle is detected in one or multiple LBT slot periods (LBT slot duration) out of a defer period (defer duration). Here, Listen Before Talk (LBT) may be a procedure in which whether a medium is idle or Busy is given based on carrier sense. The carrier sense may be a procedure in which Energy detection is performed in a medium. For example, "busy" may be a state in which an energy amount detected by means of carrier sense is larger than a prescribed threshold. Further, "idle" may be a state in which the energy amount detected by means of carrier sense is smaller than the prescribed threshold. A fact that the energy amount detected by means of carrier sense is equal to the prescribed threshold may be "idle". A fact that the energy amount detected by means of carrier sense is equal to the prescribed threshold may be "busy".

Being idle may be not being busy. Being busy may be not being idle.

The LBT slot period is a unit of LBT. For each LBT slot period, whether a medium is idle or busy may be given. For example, the LBT slot period may be 9 microseconds.

The defer period may at least include a period $T_f$ and one or multiple LBT slot periods. The length of the defer period is referred to as Td. For example, the period $T_f$ may be 16 microseconds.

Figure 12:
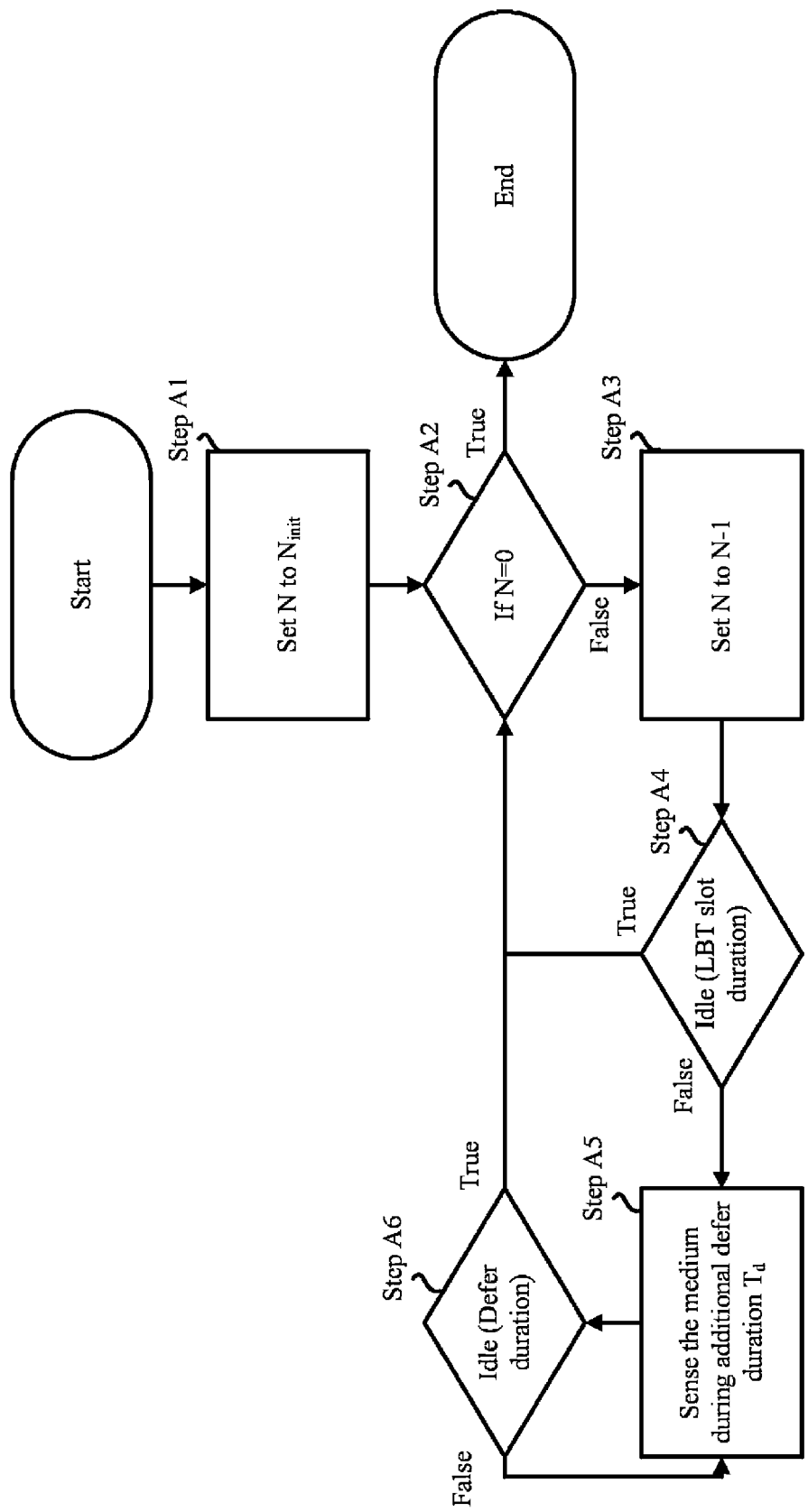
FIG. 12 is a diagram illustrating an example of a count procedure according to an aspect of the present embodiment.

FIG. 12 is a diagram illustrating an example of the count procedure according to an aspect of the present embodiment. The count procedure at least includes a part or all of step A1 to step A6. Step A1 includes operation of setting a value of a counter N to $N_{init}$. Here, $N_{init}$ is a value randomly (or pseudo-randomly) selected out of integer values included in the range from 0 to CWp. CWp is a Contention Window Size (CWS) for a channel access priority class p.

In step A2, whether or not the value of the counter N is 0 is determined. Step A2 includes operation of completing (or ending) the channel access procedure in a case that the counter N is 0. Step A2 includes operation of proceeding to step A3 in a case that the counter N is different from 0. Here, True in FIG. 12 corresponds to a case that an evaluation expression is True in a step including operation of determining the evaluation expression. False corresponds to a case that an evaluation expression is false in a step including operation of determining the evaluation expression. In step A2, the evaluation expression corresponds to counter N=0.

For example, step A3 may include a step of decrementing the value of the counter N. To decrement the value of the counter N may mean that the value of the counter N is reduced by 1. In other words, to decrement the value of the counter N may mean that the value of the counter N is set to N−1.

For example, step A3 may include a step of decrementing the value of the counter N in a case that N>0. Step A3 may include a step of decrementing the value of the counter N in a case that the base station apparatus 3 or the terminal apparatus 1 selects to decrement the counter N. Step A3 may include a step of decrementing the value of the counter N in a case that N>0, and the base station apparatus 3 and the terminal apparatus 1 select to decrement the counter N.

For example, step A4 may include operation of performing carrier sense of a medium in an LBT slot period d, and proceeding to step A2 in a case that and the LBT slot period d is idle. Step A4 may include operation of proceeding to step A2 in a case that the LBT slot period d is determined as idle by means of carrier sense. Step A4 may include operation of performing carrier sense in the LBT slot period d, and proceeding to step A5 in a case that the LBT slot period d is busy. Step A4 may include operation of proceeding to step A5 in a case that the LBT slot period d is determined as busy by means of carrier sense. Here, the LBT slot period d may be an LBT slot period, which is an LBT slot period that follows the LBT slot period in which carrier sense is already performed in the count procedure. In step A4, the evaluation expression may correspond to a fact that the LBT slot period d is idle.

Step A5 includes operation of performing carrier sense until a fact that a medium is busy in a certain LBT slot period included in the defer period is detected, or until a fact that a medium is idle in all of the LBT slot periods included in the defer period is detected.

Step A6 includes operation of proceeding to step A5 in a case that a medium is detected as busy in a certain LBT slot period included in the defer period. Step A6 includes operation of proceeding to step A2 in a case that a fact that a medium is idle in all of the LBT slot periods included in the defer period is detected. In step A6, the evaluation expression may correspond to a fact that a medium is idle in the certain LBT slot period.

$CW_{min,p}$ indicates a minimum value in a range of possible values of the contention window size CWp for the channel access priority class p. $CW_{max,p}$ indicates a maximum value in a range of possible values of the contention window size CWp for the channel access priority class p. The contention window size CWp for the channel access priority class p is also referred to as CWp.

In a case that a transmission wave at least including a physical channel (for example, a PDSCH) related to the channel access priority class p is transmitted, CWp is managed by the base station apparatus 3 or the terminal apparatus 1, and CWp is adjusted before step A1 of the count procedure (adjustment procedure of CWp is performed).

In a certain component carrier, New Radio-Unlicensed (NR-U) may be applied. In a certain serving cell, NR-U may be applied. A fact that NR-U is applied in a certain component carrier (or a certain serving cell) may at least include a technique (framework, configuration) including a part or all of the following element A1 to element A6.

Element A1: In the certain component carrier (or the certain serving cell), the second SS burst set is configured Element A2: The base station apparatus 3 transmits the second SS/PBCH block in the certain component carrier (or the certain serving cell)

Element A3: The terminal apparatus 1 receives the second SS/PBCH block in the certain component carrier (or the certain serving cell)

Element A4: The base station apparatus 3 transmits the PDCCH in the second Type 0 PDCCH common search space set in the certain component carrier (or the certain serving cell)

Element A5: The terminal apparatus 1 receives the PDCCH in the second Type 0 PDCCH common search space set in the certain component carrier (or the certain serving cell)

Element A6: A higher layer parameter (for example, a field included in the MIB) related to NR-U indicates a first value (for example, 1)

In a certain component carrier, New Radio-Unlicensed (NR-U) need not be applied. In a certain serving cell, NR-U need not be applied. A fact that NR-U is not applied in a certain component carrier (or a certain serving cell) may at least include a technique (framework, configuration) including a part or all of the following element B1 to element B6.

Element B1: In the certain component carrier (or the certain serving cell), the first SS burst set is configured Element B2: The base station apparatus 3 transmits the first SS/PBCH block in the certain component carrier (or the certain serving cell)

Element B3: The terminal apparatus 1 receives the first SS/PBCH block in the certain component carrier (or the certain serving cell)

Element B4: The base station apparatus 3 transmits the PDCCH in the first Type 0 PDCCH common search space set in the certain component carrier (or the certain serving cell)

Element B5: The terminal apparatus 1 receives the PDCCH in the first Type 0 PDCCH common search space set in the certain component carrier (or the certain serving cell)

Element B6: A higher layer parameter (for example, a field included in the MIB) related to NR-U indicates a value (for example, 0) different from the first value The certain component carrier may be configured in a licensed band. The certain serving cell may be configured in a licensed band. Here, a fact that the certain component carrier (or the certain serving cell) is configured in a licensed band may at least include a part or all of the following configuration 1 to configuration 3.

Configuration 1: A higher layer parameter indicating operation in a licensed band for the certain component carrier (or the certain serving cell) is given, or a higher layer parameter indicating operation in an unlicensed band for the certain component carrier (or the certain serving cell) is not given Configuration 2: The certain component carrier (or the certain serving cell) is configured so as to operate in a licensed band, or the certain component carrier (or the certain serving cell) is not configured so as to operate in an unlicensed band Configuration 3: The certain component carrier (or the certain serving cell) is included in a licensed band, or the certain component carrier (or the certain serving cell) is not included in an unlicensed band The licensed band may be such a band that the radio station license is required for the terminal apparatus that operates (is expected to operate) in the licensed band. The licensed band may be a band in which only terminal apparatuses manufactured by an operator (business entity, business, organization, company) with radio station license are allowed to operate. The unlicensed band may be such a band that the channel access procedure prior to transmission of the physical signal is not required.

The unlicensed band may be such a band that the radio station license is not required for the terminal apparatus that operates (is expected to operate) in the unlicensed band. The unlicensed band may be such a band in which terminal apparatuses manufactured by a part or all of an operator with the radio station license and/or an operator without the radio station license are allowed to operate. The unlicensed band may be such a band that the channel access procedure prior to transmission of the physical signal is required.

Whether or not NR-U is applied to the certain component carrier (or the certain serving cell) may be determined based on whether or not at least the certain component carrier (or the certain serving cell) is configured for a band that can be operated in the unlicensed band (for example, a band that can be operated only in the unlicensed band). For example, a list of bands designed for NR or carrier aggregation of NR may be defined. For example, in a case that a certain band is included in a band in which one or multiple bands in the list can be operated in the unlicensed band (for example, a band that can be operated only in the unlicensed band), NR-U may be applied to the certain band. In a case that a certain band is not included in a band in which one or multiple bands in the list can be operated in the unlicensed band (for example, a band that can be operated only in the unlicensed band), NR-U need not be applied to the certain band, and normal NR (for example, NR of release 15, or NR other than NR-U of release 16) may be applied.

Whether or not NR-U is applied to the certain component carrier (or the certain serving cell) may be determined based on whether or not at least the component carrier (or the serving cell) is configured for a band in which NR-U can be operated (for example, a band that can be operated only in NR-U). For example, in a case that the list of bands designed for operation of NR or carrier aggregation of NR is defined, and one or multiple bands in the list is defined as a band in which NR-U can be operated (for example, a band in which only NR-U can be operated), NR-U is applied for a case that a band configured for the component carrier (or the serving cell) is one of the one or multiple bands, and for a case it is a band other than the one or multiple bands, NR-U is not applied, and normal NR (for example, NR of release 15, or NR other than NR-U of release 16) may be applied.

Whether or not NR-U is applied to the certain component carrier (or the certain serving cell) may be determined based on information included in the system information (for example, the Master Information Block (MIB, or the Physical Broadcast Channel (PBCH))). For example, in a case that the MIB includes information indicating whether or not NR-U is applied, and the information indicates application of NR-U, NR-U may be applied to the serving cell corresponding to the MIB. In contrast, in a case that the information does not indicate application of NR-U, NR-U need not be applied to the serving cell corresponding to the MIB, and normal NR may be applied. Alternatively, the information may indicate whether or not operation is possible in the unlicensed band.

The certain component carrier may be configured in the unlicensed band. The certain serving cell may be configured in the unlicensed band. Here, a fact that the certain component carrier (or the certain serving cell) is configured in the unlicensed band may at least include a part or all of the following configuration 4 to configuration 6.

Configuration 4: A higher layer parameter indicating operation in the unlicensed band is given to the certain component carrier (or the certain serving cell)

Configuration 5: The certain component carrier (or the certain serving cell) is configured so as to operate in the unlicensed band Configuration 6: The certain component carrier (or the certain serving cell) is included in the unlicensed band "NR-U is applied to the component carrier" may mean "NR-U is applied to the serving cell", and "NR-U is not applied to the component carrier" may mean "NR-U is not applied to the serving cell".

Single transmission (single report, 1-shot transmission, 1-shot report, one-shot transmission) of the HARQ-ACK information will be described below.

For example, the single transmission of the HARQ-ACK information may be a transmission of the HARQ-ACK information including the HARQ-ACK bit corresponding to each of multiple HARQ processes on one uplink physical channel (PUCCH or PUSCH). The HARQ-ACK information including the HARQ-ACK bit corresponding to each of the multiple HARQ processes is also referred to as single HARQ-ACK information (one-shot HARQ-ACK information).

For example, the single transmission of the HARQ-ACK information may be a transmission of the HARQ-ACK information including the HARQ-ACK bit corresponding to each of multiple PDSCH candidates on one uplink physical channel (PUCCH or PUSCH). The HARQ-ACK information including the HARQ-ACK bit corresponding to each of the multiple PDSCH candidates is also referred to as single HARQ-ACK information (one-shot HARQ-ACK information). In other words, the single HARQ-ACK information may be the HARQ-ACK information including the HARQ-ACK bit corresponding to each of the multiple HARQ processes, or the HARQ-ACK information including the HARQ-ACK bit corresponding to each of the multiple PDSCH candidates.

The PDSCH candidate may indicate a resource to which the PDSCH may be mapped. The PDSCH may be transmitted on one PDSCH candidate indicated by the DCI format among the multiple PDSCH candidates.

FIG. 13 is a diagram illustrating a configuration example of the single HARQ-ACK information according to an aspect of the present embodiment. In FIG. 13, the values of the HARQ-ACK bit corresponding to each of 16 HARQ processes configured for serving cell #A and serving cell #B are illustrated. Here, the value of the HARQ-ACK bit being 1 may indicate an ACK, and the value of the HARQ-ACK bit being 0 may indicate a NACK. Alternatively, the value of the HARQ-ACK bit being 0 may indicate an ACK, and the value of the HARQ-ACK bit being 1 may indicate a NACK.

The first column in FIG. 13 indicates a HARQ process index, the second column indicates the HARQ-ACK bit corresponding to each of the HARQ processes configured for serving cell #A (HARQ-ACK bits for serving cell #A), and the third column indicates the HARQ-ACK bit corresponding to each of the HARQ processes configured for serving cell #B (HARQ-ACK bit for serving cell #B). For example, the HARQ-ACK bit corresponding to the HARQ process having an index of 0, which is configured for serving cell #A, indicates 0. The HARQ-ACK bit corresponding to the HARQ process having an index of 8, which is configured for serving cell #B, indicates 1.

The HARQ process is the object (subject, process, entity) that is managed in the MAC layer. The HARQ process may receive the transport block, and HARQ information related to the transport block. The HARQ information may include at least a part or all of a New Data Indicator (NDI), a HARQ process index, a Transport Block Size (TBS), and a Redundancy Version (RV).

The HARQ-ACK bit corresponding to the HARQ process may be the HARQ-ACK bit corresponding to the transport block received by the HARQ process.

FIG. 14 is a diagram illustrating a configuration example of the single HARQ-ACK information according to an aspect of the present embodiment. In FIG. 14, the HARQ-ACK bit corresponding to each of 8 HARQ processes configured for serving cell #A (HARQ-ACK bit for serving cell #A) is illustrated. In FIG. 14, null indicates that the HARQ-ACK bit corresponding to the HARQ process is absent (or is not reported). In other words, the single HARQ-ACK information need not include the HARQ-ACK bit corresponding to the HARQ process set to null. In this manner, the number of HARQ processes used in downlink communication for a certain serving cell may be configured based at least on a higher layer parameter. Here, the maximum value of the number of HARQ processes used in downlink communication for a certain serving cell may be 16. In a case that the higher layer parameter indicating the number of HARQ processes used in downlink communication for a certain serving cell is not received, it may be assumed that the number of HARQ processes configured for the certain serving cell may be 8.

In other words, the single HARQ-ACK information may include multiple HARQ-ACK bits corresponding to any of the HARQ processes configured for each serving cell.

FIG. 15 is a diagram illustrating a configuration example of the single HARQ-ACK information according to an aspect of the present embodiment. In FIG. 15, the HARQ-ACK bit corresponding to each of 8 HARQ processes configured for serving cell #A (HARQ-ACK bit for serving cell #A) and the HARQ-ACK bit corresponding to each of 12 HARQ processes configured for serving cell #C (HARQ-ACK bit for serving cell #C) are illustrated. In FIG. 15, the values of the HARQ-ACK bit corresponding to each of the HARQ processes configured for serving cell #B are set to null. In FIG. 15, it is assumed that serving cell #B is deactivated. In other words, in FIG. 15, it is assumed that serving cell #A and serving cell #C are activated.

Activation of the serving cell may be controlled by the MAC CE. Deactivation of the serving cell may be controlled by the MAC CE.

The single HARQ-ACK information may include a value of the NDI corresponding to the transport block received by the HARQ process.

Transmission of the single HARQ-ACK information may be triggered by the DCI format.

For example, DCI format 1_0 may be used for triggering of transmission of the single HARQ-ACK information. Transmission of the single HARQ-ACK information may be triggered based at least on a fact that the bits other than the Least Significant Bit (LSB) of the frequency domain resource assignment field included in DCI format 1_0 are set to all ones, and the least significant bit is set to 0. Here, the PDSCH need not be scheduled by DCI format 1_0. The PUCCH resource used for transmission of the single HARQ-ACK information may be given based at least on the PUCCH resource indication field included in DCI format 1_0. For example, by setting the bits other than the least significant bit of the frequency domain resource assignment field included in DCI format 1_0 to all 1, and setting the least significant bit to 0, the base station apparatus 3 may trigger transmission of the single HARQ-ACK information for the terminal apparatus 1. For example, the terminal apparatus 1 may detect DCI format 1_0, and determine transmission of the single HARQ-ACK information, based at least on the fact that the bits other than the least significant bit of the frequency domain resource assignment field included in DCI format 1_0 are set to all ones, and the least significant bit is set to 0.

For example, as described above, by using a specific code point of the frequency domain resource assignment field, efficient triggering of transmission of the single HARQ-ACK information can be implemented. For example, by setting the bits other than the least significant bit of the frequency domain resource assignment field to all 1, and setting the least significant bit to 0, the code point for triggering of PDCCH order can be avoided. Here, the PDCCH order is triggered based on a fact that the frequency domain resource assignment field included in DCI format 1_0 is set to all ones.

For example, in a case that DCI format 1_0 used for scheduling of the PDSCH is detected, and the PUCCH resource is indicated by DCI format 1_0, transmission of the single HARQ-ACK information may be triggered. For example, in a case that DCI format 1_0 used for scheduling of the PDSCH is detected, and the PUCCH resource is not indicated by DCI format 1_0, transmission of the single HARQ-ACK information need not be triggered. For example, in a case that the base station apparatus 3 allocates the PUCCH resource for the terminal apparatus 1 by using DCI format 1_0, the DCI format may trigger transmission of the single HARQ-ACK information for the terminal apparatus 1. For example, the terminal apparatus 1 may transmit the single HARQ-ACK information, based on a fact of being allocated the PUCCH resource.

For example, in a case that DCI format 1_0 used for scheduling of the PDSCH is detected, and the PUCCH resource indication field is included in DCI format 1_0, transmission of the single HARQ-ACK information may be triggered. For example, in a case that DCI format 1_0 used for scheduling of the PDSCH is detected, and the PUCCH resource indication field is not included in DCI format 1_0, transmission of the single HARQ-ACK information need not be triggered. For example, in a case that the base station apparatus 3 transmits the PDCCH including DCI format 1_0 including the PUCCH resource indication field, the DCI format may trigger transmission of the single HARQ-ACK information for the terminal apparatus 1. The terminal apparatus 1 may transmit the single HARQ-ACK information, based on detection of DCI format 1_0 including the PUCCH resource indication field.

For example, in a case that DCI format 1_0 used for scheduling of the PDSCH is detected, the PUCCH resource is indicated by DCI format 1_0, and a CRC sequence added to the DCI format is scrambled with a C-RNTI, transmission of the single HARQ-ACK information may be triggered. For example, in a case that DCI format 1_0 used for scheduling of the PDSCH is detected, the PUCCH resource is indicated by DCI format 1_0, and a CRC sequence added to the DCI format is scrambled with a TC-RNTI, transmission of the single HARQ-ACK information need not be triggered. The PUCCH resource used for transmission of the single HARQ-ACK information may be given based at least on the PUCCH resource indication field included in DCI format 1_0.

For example, in a case that DCI format 1_0 is detected in a certain serving cell, and NR-U is applied to the certain serving cell, the information bit (field) indicating whether or not transmission of the single HARQ-ACK information is triggered may be included in DCI format 1_0. For example, in a case that DCI format 1_0 is detected in a certain serving cell, and NR-U is not applied to the certain serving cell, the information bit indicating whether or not transmission of the single HARQ-ACK information is triggered need not be included in DCI format 1_0. For example, in a case that the base station apparatus 3 transmits the PDCCH including DCI format 1_0 in a certain serving cell, and applies NR-U to the terminal apparatus 1 connected to the certain serving cell, the base station apparatus 3 may include the information bit indicating whether or not transmission of the single HARQ-ACK information is triggered in DCI format 1_0. For example, the terminal apparatus 1 may determine whether or not the single HARQ-ACK information is transmitted, based on the information bit included in DCI format 1_0.

For example, according to the above configuration, preferable signaling can be provided for the terminal apparatus 1 to which NR-U is applied.

For example, the single HARQ-ACK information triggered by DCI format 1_0 detected in a certain serving cell among multiple serving cells configured for the terminal apparatus 1 may include the HARQ-ACK bit corresponding to the HARQ process configured for the certain serving cell. The single HARQ-ACK information need not include the HARQ-ACK bit corresponding to the HARQ process configured for serving cells other than the certain serving cell.

For example, the base station apparatus 3 may transmit the PDCCH including DCI format 1_0 in a certain serving cell among multiple serving cells configured for the terminal apparatus 1. Based at least on DCI format 1_0, transmission of the single HARQ-ACK information including the HARQ-ACK bit corresponding to the certain serving cell may be triggered. For example, the terminal apparatus 1 may include the HARQ-ACK bit corresponding to the certain serving cell in the single HARQ-ACK information.

For example, according to the above configuration, the number of bits of the single HARQ-ACK information can be preferably controlled for the terminal apparatus 1 configured with carrier aggregation.

For example, the single HARQ-ACK information triggered by DCI format 1_0 detected in a certain serving cell among multiple serving cells configured for the terminal apparatus 1 may include the HARQ-ACK bit corresponding to the HARQ process configured for a representative serving cell. Here, the certain serving cell may be different from the representative serving cell. The single HARQ-ACK information need not include the HARQ-ACK bit corresponding to the HARQ process configured for serving cells other than the representative serving cell. The single HARQ-ACK information need not include the HARQ-ACK bit corresponding to the HARQ process configured for the certain serving cell. For example, the base station apparatus 3 may transmit the PDCCH including DCI format 1_0 in a certain serving cell among multiple serving cells configured for the terminal apparatus 1. Based at least on DCI format 1_0, transmission of the single HARQ-ACK information including the HARQ-ACK bit corresponding to the representative serving cell may be triggered. Here, the certain serving cell may be different from the representative serving cell. For example, the terminal apparatus 1 may include the HARQ-ACK bit corresponding to the representative serving cell in the single HARQ-ACK information.

For example, according to the above configuration, the number of bits of the single HARQ-ACK information can be preferably controlled for the terminal apparatus 1 configured with carrier aggregation.

The representative serving cell is a serving cell. For example, the representative serving cell may be a primary cell. For example, the representative serving cell may be a primary SCG cell. For example, the representative serving cell may be a PUCCH cell. For example, the representative serving cell may be indicated by a higher layer parameter.

For example, DCI format 1_1 may be used for triggering of transmission of the single HARQ-ACK information. Transmission of the single HARQ-ACK information may be triggered based at least on a fact that the bits of the frequency domain resource assignment field included in DCI format 1_1 are set to all ones. Here, the PDSCH need not be scheduled by DCI format 1_1. The PUCCH resource used for transmission of the single HARQ-ACK information may be given based at least on the PUCCH resource indication field included in DCI format 1_1. For example, by setting the frequency domain resource assignment fields included in DCI format 1_1 equal to all ones, the base station apparatus 3 may trigger transmission of the single HARQ-ACK information for the terminal apparatus 1. For example, the terminal apparatus 1 may detect DCI format 1_1, and determine transmission of the single HARQ-ACK information, based at least on the fact that the frequency domain resource assignment field included in DCI format 1_1 is set to all ones.

For example, as described above, by using a specific code point of the frequency domain resource assignment field, efficient triggering of transmission of the single HARQ-ACK information can be implemented.

For example, in a case that DCI format 1_1 is detected in a certain serving cell, and NR-U is applied to the certain serving cell, the information bit indicating whether or not transmission of the single HARQ-ACK information is triggered may be included in DCI format 1_1. For example, in a case that DCI format 1_1 is detected in a certain serving cell, and NR-U is not applied to the certain serving cell, the information bit indicating whether or not transmission of the single HARQ-ACK information is triggered need not be included in DCI format 1_1. For example, the base station apparatus 3 may transmit the PDCCH including DCI format 1_1 including the information bit indicating whether or not transmission of the single HARQ-ACK information is triggered. For example, the terminal apparatus 1 may determine whether or not the single HARQ-ACK information is transmitted, based on the information bit included in DCI format 1_1.

For example, whether or not the information bit indicating whether or not transmission of the single HARQ-ACK information is triggered is included in DCI format 1_1 may be given based at least on a higher layer parameter.

For example, the single HARQ-ACK information triggered by DCI format 1_1 detected in a certain serving cell may include one or multiple HARQ-ACK bits corresponding to any of the HARQ processes configured for a set including one or multiple serving cells. The set may be indicated by a higher layer parameter. The set may be selected by a field included in DCI format 1_1 from one or multiple sets.

For example, whether or not the information bit indicating whether or not transmission of the single HARQ-ACK information is triggered is included in DCI format 1_1 may be given based at least on a higher layer parameter. For example, the higher layer parameter may be system information.

For example, DCI format 0_0 may be used for triggering of transmission of the single HARQ-ACK information. Transmission of the single HARQ-ACK information may be triggered based at least on a fact that the bits of the frequency domain resource assignment field included in DCI format 0_0 are set to all ones. Here, the PUSCH need not be scheduled by DCI format 0_0. In a case that the PUCCH resource is used for transmission of the single HARQ-ACK information, the PUCCH resource may be given based at least on the information bit included in DCI format 0_0. For example, by setting the frequency domain resource assignment field included in DCI format 0_0 equal to all ones, the base station apparatus 3 may trigger transmission of the single HARQ-ACK information for the terminal apparatus 1. For example, the terminal apparatus 1 may detect DCI format 0_0, and determine transmission of the single HARQ-ACK information, based at least on the fact that the frequency domain resource assignment field included in DCI format 0_0 is set to all ones.

For example, as described above, by using a specific code point of the frequency domain resource assignment field, efficient triggering of transmission of the single HARQ-ACK information can be implemented.

FIG. 16 is a diagram illustrating a configuration example of fields of DCI format 0_0 according to an aspect of the present embodiment. In an example illustrated in FIG. 16, the first field included in DCI format 0_0 is a DCI format identification field (ID for DCI formats), followed by a frequency domain resource assignment field (Frequency Domain Resource Assignment (FDRA)), a time domain resource assignment field (Time Domain Resource Assignment (TDRA)), a frequency hopping flag field (hopping flag), an MCS field (MCS), an NDI field (NDI), an RV field (RV), an HPN field (HPN), a TPC field (TPC), a padding field (Padding), and a UL/SUL indication field (UL/SUL indicator) being allocated in the mentioned order. Here, the NDI field is a field indicating a value of the NDI. The Redundancy Version (RV) field is a field indicating a value of the RV. The HARQ Process Number (HPN) field is a field indicating the HARQ process index. The Transmission Power Control (TPC) field is a field indicating a value used for control of transmission power of the PUSCH. The padding field is a field at least used for making the number of bits (size) of DCI format 1_0 and DCI format 0_0 equal to each other. The UpLink/Supplementary UpLink (UL/SUL) indication field is, in a case that DCI format 0_0 including the UL/SUL field is detected in a certain serving cell and the PUSCH is scheduled by DCI format 0_0, a field indicating to which of the first uplink component carrier or the second component carrier the PUSCH is mapped. Here, the first uplink component carrier and the second uplink component carrier are included in the serving cell.

In FIG. 16, the number of bits of the DCI format identification field is 1. The number X of bits of the frequency domain resource assignment field is given based at least on the number of resource blocks of the BWP to which the PUSCH is mapped. The number of bits of the time domain resource assignment field is 4. The number of bits of the frequency hopping flag field is 1. The number of bits of the MCS field is 5. The number of bits of the NDI field is 1. The number of bits of the RV field is 2. The number of bits of the HPN field is 4. The number of bits of the TPC field is 3. The number Y of bits of the padding field is given such that the number of bits of DCI format 0_0 is made equal to the number of bits of DCI format 1_0. The number Z of bits of the UL/SUL indication field is 1 or 0.

In a case that the SUL is configured for the serving cell (a higher layer parameter indicating a configuration related to the SUL in the serving cell is included in ServingCellConfig), and the number of bits of DCI format 1_0 is larger than the number of bits of DCI format 0_0, the number Z of bits of the UL/SUL indication field may be 1. In a case that the SUL is not configured for the serving cell (a higher layer parameter indicating a configuration related to the SUL in the serving cell is not included in ServingCellConfig), the number Z of bits of the UL/SUL indication field may be 0. In a case that number of bits of DCI format 1_0 is smaller than the number of bits of DCI format 0_0, the number Z of bits of the UL/SUL indication field may be 0. In a case that the number of bits of DCI format 1_0 and the number of bits of DCI format 0_0 are equal to each other, the number Z of bits of the UL/SUL indication field may be 0. The SUL performs communication by using the first uplink component carrier and the second uplink component carrier included in a certain serving cell.

The information bit indicating whether or not transmission of the single HARQ-ACK information is triggered may be added after (or immediately after) the padding field included in DCI format 0_0. The information bit indicating whether or not transmission of the single HARQ-ACK information is triggered may be added immediately before the UL/SUL indication field included in DCI format 0_0. The information bit indicating whether or not transmission of the single HARQ-ACK information is triggered may be added between the padding field and the UL/SUL indication field included in DCI format 0_0. The information bit indicating whether or not transmission of the single HARQ- ACK information is triggered may be given by using a part of the bits included in the padding field included in DCI format 0_0. For example, the base station apparatus 3 may add the information bit at a prescribed position (after the padding field, immediately before the UL/SUL indication field, a part of the bits included in the padding field), so as to transmit the PDCCH including DCI format 0_0. For example, the terminal apparatus 1 may determine whether or not the single HARQ-ACK information is transmitted, based on the information bit included in DCI format 0_0.

For example, according to the above configuration, the number of bits of DCI format 0_0 and DCI format 1_0 can be easily made equal to each other.

For example, in a case that DCI format 0_0 is detected in a certain serving cell, and NR-U is applied to the certain serving cell, a field indicating whether or not transmission of the single HARQ-ACK information is triggered may be included in DCI format 0_0. For example, in a case that DCI format 0_0 is detected in a certain serving cell, and NR-U is not applied to the certain serving cell, the field indicating whether or not transmission of the single HARQ-ACK information is triggered need not be included in DCI format 0_0. For example, in a case that the base station apparatus 3 transmits the PDCCH including DCI format 0_0 in a certain serving cell, and applies NR-U to the terminal apparatus 1 connected to the certain serving cell, the base station apparatus 3 may include the information bit indicating whether or not transmission of the single HARQ-ACK information is triggered in DCI format 0_0. For example, the terminal apparatus 1 may determine whether or not the single HARQ-ACK information is transmitted, based on the information bit included in DCI format 0_0.

For example, according to the above configuration, preferable signaling can be provided for the terminal apparatus 1 to which NR-U is applied.

For example, the single HARQ-ACK information triggered by DCI format 0_0 detected in a certain serving cell among multiple serving cells configured for the terminal apparatus 1 may include the HARQ-ACK bit corresponding to the HARQ process configured for the certain serving cell. The single HARQ-ACK information need not include the HARQ-ACK bit corresponding to the HARQ process configured for serving cells other than the certain serving cell. For example, the base station apparatus 3 may transmit the PDCCH including DCI format 0_0 in a certain serving cell among multiple serving cells configured for the terminal apparatus 1. Based at least on DCI format 0_0, transmission of the single HARQ-ACK information including the HARQ-ACK bit corresponding to the certain serving cell may be triggered. For example, the terminal apparatus 1 may include the HARQ-ACK bit corresponding to the certain serving cell in the single HARQ-ACK information.

For example, according to the above configuration, the number of bits of the single HARQ-ACK information can be preferably controlled for the terminal apparatus 1 configured with carrier aggregation.

For example, the single HARQ-ACK information triggered by DCI format 0_0 detected in a certain serving cell among multiple serving cells configured for the terminal apparatus 1 may include the HARQ-ACK bit corresponding to the HARQ process configured for the representative serving cell. Here, the certain serving cell may be different from the representative serving cell. The single HARQ-ACK information need not include the HARQ-ACK bit corresponding to the HARQ process configured for serving cells other than the representative serving cell. The single HARQ-ACK information need not include the HARQ-ACK bit corresponding to the HARQ process configured for the certain serving cell. For example, the base station apparatus 3 may transmit the PDCCH including DCI format 0_0 in a certain serving cell among multiple serving cells configured for the terminal apparatus 1. Based at least on DCI format 0_0, transmission of the single HARQ-ACK information including the HARQ-ACK bit corresponding to the representative serving cell may be triggered. Here, the certain serving cell may be different from the representative serving cell. For example, the terminal apparatus 1 may include the HARQ-ACK bit corresponding to the representative serving cell in the single HARQ-ACK information.

For example, according to the above configuration, the number of bits of the single HARQ-ACK information can be preferably controlled for the terminal apparatus 1 configured with carrier aggregation.

For example, DCI format 0_1 may be used for triggering of transmission of the single HARQ-ACK information. Transmission of the single HARQ-ACK information may be triggered based at least on a fact that the bits of the frequency domain resource assignment field included in DCI format 0_1 are set to all ones. Here, the PUSCH need not be scheduled by DCI format 0_1. The PUCCH resource used for transmission of the single HARQ-ACK information may be given based at least on a field included in DCI format 0_1.

For example, in a case that DCI format 0_1 is detected in a certain serving cell, and NR-U is applied to the certain serving cell, the field indicating whether or not transmission of the single HARQ-ACK information is triggered may be included in DCI format 0_1. For example, in a case that DCI format 0_1 is detected in a certain serving cell, and NR-U is not applied to the certain serving cell, the field indicating whether or not transmission of the single HARQ-ACK information is triggered need not be included in DCI format 0_1.

For example, whether or not the field indicating whether or not transmission of the single HARQ-ACK information is triggered is included in DCI format 0_1 may be given based at least on a higher layer parameter.

For example, the single HARQ-ACK information triggered by DCI format 0_1 detected in a certain serving cell may include one or multiple HARQ-ACK bits corresponding to any of the HARQ processes configured for a set including one or multiple serving cells. The set may be indicated by a higher layer parameter. The set may be selected by a field included in DCI format 0_1 from one or multiple sets.

For example, whether or not the information bit indicating whether or not transmission of the single HARQ-ACK information is triggered is included in DCI format 0_1 may be given based at least on a higher layer parameter. For example, the higher layer parameter may be system information.

Various aspects of apparatuses according to an aspect of the present embodiment will be described below.

(1) In order to accomplish the object described above, aspects of the present invention are contrived to provide the following means. In other words, the first aspect of the present invention is a terminal apparatus, including: a receiver configured to receive DCI format 1_0; and a transmitter configured to at least transmit multiple HARQ-ACK bits corresponding to any of multiple transport blocks managed by any of multiple HARQ processes, based at least on a fact that bits other than a least significant bit of a frequency domain assignment field included in the DCI format 1_0 are set to all ones, and the least significant bit is set to 0.

(2) The second aspect of the present invention is a terminal apparatus, including: a receiver configured to receive a PDCCH; and a transmitter configured to transmit multiple HARQ-ACK bits corresponding to any of multiple transport blocks managed by any of a first set of multiple HARQ processes in a case that DCI format 1_0 is detected in the PDCCH, and transmit multiple HARQ-ACK bits corresponding to any of multiple transport blocks managed by any of a second set of multiple HARQ processes in a case that DCI format 1_1 is detected in the PDCCH, wherein the first set includes 16 HARQ processes, and the second set includes as many HARQ processes as a number configured by a higher layer parameter.

(3) The third aspect of the present invention is a terminal apparatus that performs communication with a base station apparatus in multiple serving cells including one primary cell, the terminal apparatus including: a receiver configured to receive a PDCCH in one serving cell among the multiple serving cells; and a transmitter configured to transmit multiple HARQ-ACK bits corresponding to any of multiple transport blocks managed by any of a first set of multiple HARQ processes in a case that DCI format 1_0 is detected in the PDCCH, and transmit multiple HARQ-ACK bits corresponding to any of multiple transport blocks managed by any of a second set of multiple HARQ processes in a case that DCI format 1_1 is detected in the PDCCH, wherein the first set includes a HARQ process configured for the one primary cell, or includes a HARQ process configured for the one serving cell, and the second set includes a HARQ process configured for any of a set of serving cells configured by an RRC parameter.

(4) In the third aspect of the present invention, the set of the serving cells includes an activated serving cell among the multiple serving cells, the set of the serving cells does not include a non-activated serving cell among the multiple serving cells, and the serving cell is activated by a MAC CE.

(5) The fourth aspect of the present invention is a terminal apparatus, including: a receiver configured to receive DCI format 0_0; and a transmitter configured to at least transmit multiple HARQ-ACK bits corresponding to any of multiple transport blocks managed by any of multiple HARQ processes, based at least on a fact that all bits of a frequency domain assignment field included in the DCI format 0_0 are set to all ones.

(6) The fifth aspect of the present invention is a terminal apparatus, including: a receiver configured to receive DCI format 0_0; and a transmitter configured to at least transmit multiple HARQ-ACK bits corresponding to any of multiple transport blocks managed by any of multiple HARQ processes, based at least on a fact that a trigger field included in the DCI format 0_0 is set to a prescribed value, wherein the trigger field is mapped to a position immediately before a UL/SUL indication field.

(7) The sixth aspect of the present invention is a base station apparatus, including: a transmitter configured to trigger transmission of multiple HARQ-ACK bits corresponding to any of multiple transport blocks managed by any of multiple HARQ processes, based at least on setting of bits other than a least significant bit of a frequency domain assignment field included in DCI format 1_0 to all 1, and setting of the least significant bit to 0; and a receiver configured to receive the multiple HARQ-ACK bits.

(8) The seventh aspect of the present invention is a base station apparatus, including: a transmitter configured to trigger transmission of multiple HARQ-ACK bits corresponding to any of multiple transport blocks managed by any of a first set of multiple HARQ processes, based on transmission of DCI format 1_0 on a PDCCH, and trigger transmission of multiple HARQ-ACK bits corresponding to any of multiple transport blocks managed by any of a second set of multiple HARQ processes, based on transmission of DCI format 1_1 on the PDCCH; and a receiver configured to receive the multiple HARQ-ACK bits, wherein the first set includes 16 HARQ processes, and the second set includes as many HARQ processes as a number configured by a higher layer parameter.

(9) The eighth aspect of the present invention is a base station apparatus that performs communication with a terminal apparatus in multiple serving cells including one primary cell, the base station apparatus including a transmitter configured to transmit a PDCCH in one serving cell among the multiple serving cells, transmit multiple HARQ-ACK bits corresponding to any of multiple transport blocks managed by any of a first set of multiple HARQ processes, based on transmission of DCI format 1_0 on the PDCCH, and transmit multiple HARQ-ACK bits corresponding to any of multiple transport blocks managed by any of a second set of multiple HARQ processes, based on transmission of DCI format 1_1 on the PDCCH, wherein the first set includes a HARQ process configured for the one primary cell, or includes a HARQ process configured for the one serving cell, and the second set includes a HARQ process configured for any of a set of serving cells configured by an RRC parameter.

(10) In the eighth aspect of the present invention, the set of the serving cells includes an activated serving cell among the multiple serving cells, the set of the serving cells does not include a non-activated serving cell among the multiple serving cells, and the serving cell is activated by a MAC CE.

(11) The ninth aspect of the present invention is a base station apparatus, including: a transmitter configured to trigger transmission of multiple HARQ-ACK bits corresponding to any of multiple transport blocks managed by any of multiple HARQ processes, based at least on setting of bits of a frequency domain assignment field included in DCI format 0_0 equal to all ones; and a receiver configured to receive the multiple HARQ-ACK bits.

(12) The tenth aspect of the present invention is a base station apparatus, including: a transmitter configured to trigger transmission of multiple HARQ-ACK bits corresponding to any of multiple transport blocks managed by any of multiple HARQ processes, based at least on setting of a trigger field included in DCI format 0_0 to a prescribed value; and a receiver configured to receive the multiple HARQ-ACK bits, wherein the trigger field is mapped to a position immediately before a UL/SUL indication field.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit
91, 92, 93, 94 Search space set
300 Component carrier
301 Primary cell
302, 303 Secondary cell
3000 Point
3001, 3002 Resource grid
3003, 3004 BWP
3011, 3012, 3013, 3014 Offset
3100, 3200 Common resource block set

The invention claimed is:

1. A terminal device comprising:
reception circuitry configured to receive a physical downlink control channel (PDCCH) with a downlink control information (DCI) format used for scheduling a physical downlink shared channel (PDSCH) for a serving cell, a frequency domain resource assignment field in the DCI format being used for indicating frequency domain resources for the PDSCH, and at least based on that all bits in the frequency domain resource assignment field are set to 1, and
transmission circuitry configured to transmit a one-shot hybrid auto repeat request-acknowledgment (HARQ-ACK) information comprising of a HARQ-ACK information bit for each of HARQ processes configured for the serving cell, wherein
in a case that the all bits in the frequency domain resource assignment field are set to 1, the PDSCH is not scheduled by the DCI format.

2. A base station device comprising:
transmission circuitry configured to transmit a physical downlink control channel (PDCCH) with a downlink control information (DCI) format used for scheduling a physical downlink shared channel (PDSCH) for a serving cell, a frequency domain resource assignment field in the DCI format being used for indicating frequency domain resources for the PDSCH, and at least based on that all bits in the frequency domain resource assignment field are set to 1, and reception circuitry configured to receive a one-shot hybrid auto repeat request-acknowledgment (HARQ-ACK) information comprising of a HARQ-ACK information bit for each of HARQ processes configured for the serving cell, wherein in a case that the all bits in the frequency domain resource assignment field are set to 1, the PDSCH is not scheduled by the DCI format.

3. A communication method used for a terminal device, the communication method comprising:

receiving a physical downlink control channel (PDCCH) with a downlink control information (DCI) format used for scheduling a physical downlink shared channel (PDSCH) for a serving cell, a frequency domain resource assignment field in the DCI format being used for indicating frequency domain resources for the PDSCH, and at least based on that all bits in the frequency domain resource assignment field are set to 1, and transmitting a one-shot hybrid auto repeat request-acknowledgment (HARQ-ACK) information comprising of a HARQ-ACK information bit for each of HARQ processes configured for the serving cell, wherein in response to the all bits in the frequency domain resource assignment field being set to 1, the PDSCH is not scheduled by the DCI format.

* * * * *